United States Patent [19]
Bentley et al.

[11] Patent Number: 5,987,242
[45] Date of Patent: Nov. 16, 1999

[54] OBJECT-ORIENTED COMPUTERIZED MODELING SYSTEM

[75] Inventors: Keith Bentley, Glenmore, Pa.; Samuel Wilson, Wilmington, Del.; Earlin Lutz, West Chester, Pa.; James Bartlett, Elverson, Pa.; John Gooding, Spring City, Pa.

[73] Assignee: Bentley Systems, Incorporated, Exton, Pa.

[21] Appl. No.: 08/966,890

[22] Filed: Nov. 10, 1997

Related U.S. Application Data

[62] Division of application No. 08/612,622, Mar. 6, 1996, Pat. No. 5,815,415
[60] Provisional application No. 60/010,234, Jan. 19, 1996, and provisional application No. 60/011,285, Feb. 7, 1996.

[51] Int. Cl.[6] .................................................. G06F 9/455
[52] U.S. Cl. ........................................................ 395/500.34
[58] Field of Search ....................... 395/500.34, 500.27, 395/500.23, 703, 706, 701, 200.15; 364/578

[56] References Cited

U.S. PATENT DOCUMENTS

| | | |
|---|---|---|
| 4,809,170 | 2/1989 | Leblang et al. . |
| 4,951,192 | 8/1990 | Chase, Jr. et al. . |
| 5,339,435 | 8/1994 | Lubkin et al. . |
| 5,347,632 | 9/1994 | Filepp et al. . |
| 5,625,580 | 4/1997 | Read et al. . |
| 5,634,010 | 5/1997 | Ciscon et al. . |

*Primary Examiner*—Kevin J. Teska
*Assistant Examiner*—Dan Fiul
*Attorney, Agent, or Firm*—Akin, Gump, Strauss, Hauer & Feld, L.L.P.

[57] ABSTRACT

A computer system for modeling is disclosed, where the computer system has a storage device, first and second platforms, a portable persistent model, and first and second platform-dependent computerized modeling systems (CMS). Each platform is interfaced to the storage device and provides system-dependent services. The first platform has a first type of operating system and a first type of computer hardware including a first memory, and the second platform has a second type of operating system and a second type of computer hardware including a second memory. The model resides in the storage device in a platform-independent format and includes persistent component objects. The first CMS resides in the first platform memory and the second platform-dependent CMS resides in the second platform memory. Each CMS provides CMS services including retrieving the model from the storage device, manipulating the model, changing the model by adding and removing persistent objects, and persistently saving the model to the storage device. Each CMS includes a static kernel and a dynamic framework. The kernel executes on the platform and interfaces to the operating system and the computer hardware, and provides services necessary to load and execute CMS services and to interface to the platform services. The framework executes on the platform and interfaces to the kernel, provides a platform-independent visual interface between the CMS and a CMS user, and employs the services of the kernel.

12 Claims, 17 Drawing Sheets

| | OBJECT DESCRIPTOR | CLASS INSTALLED | INSTANCE DATA | REFERENCE OBJECTS CONNECTED TO |
|---|---|---|---|---|
| POTENTIAL OBJECT | CONNECT NO | NO | NO | NO |
| NON-RESIDENT OBJECT | YES | YES | NO | NO |
| RESIDENT OBJECT | FAULT YES | YES | YES | YES |

OBJECT-ORIENTED COMPUTERIZED MODELING SYSTEM

This is a division of application Ser. No. 08/612,622, filed Mar. 6, 1996 now U.S. Pat. No. 5,815,415, and based on provisional applications Ser. No. 60/010,234 of Jan. 19, 1996 and Ser. No. 60/011,205 of Feb. 7, 1996.

FIELD OF THE INVENTION

The present invention relates to a system for computerized modeling. More particularly, the present invention is related to an object-oriented computerized modeling system that is employed to construct a model from component objects and the like and to persistently save and recall the constructed model.

BACKGROUND OF THE INVENTION

A typical computer-aided design ("CAD") system employed in engineering contexts uses a geometry-oriented approach to define and represent engineering information. The data is generally stored in a large set of geometrically organized files with links to external non-graphical data. The format and content of the files are predefined by the CAD system, with all of the data types known to the system compiled into the program.

Such an approach has the advantage of uniformity and predictability between system users from different engineering domains. In a system implemented with great attention to hardware and version compatibility, data files created with one version of the CAD system can be viewed by other versions of the same CAD system regardless of hardware platform. The approach works well for creating 2D drawings and 3D models of the physical properties of a design, but lacks the sophistication and flexibility to maintain the structure, topology, and additional attributes or descriptive information that accompany a complete engineering model. Furthermore, multi-platform and multi-version software support is a serious burden for both the original producer of the CAD system and for others that add customized extensions.

To properly model a complex design, engineering or otherwise, a computerized modeling system ("CMS") must represent not just the geometric properties of a model, but also the domain-specific relationships between components in the design and tacit information about the model that arises during the development of the model. However, the most efficient strategy for organizing and storing model information does not always correlate with the geometric properties of the information.

Further, since the data types expressed in an engineering model vary widely between engineering domains (electrical, mechanical, fluids, e.g.), it is not practical to express all of the possible combinations of data types within the program that operates the CMS. Moreover, since model data from differing domains may be simultaneously required in arbitrary combinations by a user, multiple, unrelated domain-specific tools cannot be employed.

CMS Requirements

A CMS must solve the problem described above by providing flexible programming tools that allow a software developer having engineering domain-specific expertise to develop programs and data structures ("schemas") relevant to any such domain. A user of the CMS employs one or more such schemas, whereby representations of domain-specific components ("objects") derived from the schemas can be combined and integrated in arbitrary combinations in connection with a single project.

To accomplish such a goal, the CMS must address the following concerns:

Data portability and longevity—In large organizations, engineering groups often work on multiple different types of mixed hardware and operating system configurations ("platforms"). Moreover, the life cycles of a larger project will often exceed the lifetime of one or more of such platforms. Accordingly, it is essential that CMS data that originates on one platform be useable on any other platform without translation. As a result, the CMS does not constrain an otherwise natural progression to the most cost effective computer systems. Furthermore, a project defined by such CMS data can be archived and reactivated years later on a new platform without any loss of fidelity.

Similarly, the type and meaning of the information in a project can change dramatically throughout the project life cycle. For example, data for a particular component may change several times during the project life cycle, usually because the manufacturer of the component modified the component or replaced the component with a similar or related component. It must therefore be possible to refine and revise the schemas that are used by the project (i.e. allow "schema evolution") without jeopardizing the integrity of the already-existing CMS data.

Data integrity—A CMS stores a tremendous amount of valuable information. However, the value of the information can only be secure if models created by the program are accurate, reliable, and accessible. To ensure the data in a CMS model maintains internal consistency, it is necessary that such data always be accessed and modified by the same schemas that defined and created such data. It is therefore essential that such schemas be easily accessed and ubiquitous with respect to the CMS model. Moreover a CMS must minimize the need to produce and distribute copies of CMS models. As should be evident, when multiple copies of the same model exist, any individual copy stands a greater chance of being rendered partially or wholly obsolete.

Large data sets—The size of a typical CMS model can be quite large, on the order of several hundred megabytes. The CMS must handle such large models efficiently. Further, the amount of information in a model cannot be limited in a preset manner.

Many simultaneous users—CMS models are typically shared simultaneously by many users within an organization. Some users require access for inspecting and querying only, but others need access to add to or modify the model. Accordingly, the CMS must ensure that changes to the model are properly coordinated and that the model is kept in a consistent state at all times.

Many simultaneous schemas—Engineering projects typically involve collaboration among several engineering disciplines, each being represented by one or more CMS schemas. A CMS is expected to facilitate the integration of the information created by each discipline to allow easy and consistent access by users in the other disciplines. Therefore, a CMS must store and manipulate information defined by multiple schemas simultaneously. Further, it must be possible for one schema to reference information defined in and maintained by another schema within the project and that reference must be kept consistent throughout the project life cycle.

Flexibility and Extensibility—A CMS is typically refined by a developer based on the domain that the developer is directed toward. Additionally, a CMS is refined by the end user to include user-defined restrictions and extensions. Since every user has different requirements, the ability to extend and customize the system "in the field" is essential.

Performance—Engineering models in particular are characterized by large data sets, yet users demand near-instantaneous response times. A CMS must therefore be able to organize and store data such that access time to the data is optimized.

Ease of Use—A CMS user is presumed to be an expert in his domain. However, he is not necessarily a sophisticated computer user and is likely not willing to invest valuable time in extensive training. Furthermore, since multiple users from different domains will employ the same CMS, the domain-specific expertise of the users will vary widely from session to session. Accordingly, use of a CMS must be simple, intuitive, and familiar, and the schemas employed by a CMS must be flexible enough to allow access to schema data at various levels of detail and complexity depending on the user.

CMS Implementation

Given the foregoing CMS requirements, a successful CMS must incorporate a robust environment for programmers to implement schemas, and an easy-to-use environment for users to employ those schemas on real world problems. To that end, the CMS implementation must include:

Schema Environment—Schemas must contain all necessary information to display, manipulate, query, revise, and interpret a model; there can not be any application-specific expertise built into the CMS itself. Schemas must be portable so that they can execute on any platform that the CMS can execute, be inseparable from the project model, be flexible and expandable without requiring the original schema source code for recompilation, and execute efficiently. Due to the large quantity of information modeled by a CMS, the routines that process such information must do so in an efficient manner. Schemas must also be able to evolve over time such that they can be revised and extended as new requirements arise.

Application Framework—The geometric tools (location, manipulation, creation, display, visualization, vector algebra, etc.) for manipulating schema objects must be presented to the user in a familiar and easy-to-use environment, or "application framework". The user interface programs must be portable across all platforms on which the CMS runs so that users can choose among appropriate platforms. However, the application framework itself must interact with the native Operating System or Graphical User environment on which the framework executes. Such interaction must be transparent to the user.

In certain cases, special support must be added to the application framework to take advantage of advanced capabilities of certain platforms. Wherever possible, the capabilities of these advanced systems should be emulated on lesser platforms.

Change Propagation—When an object in a model is modified, other objects in the model may change as a result. A CMS must express relationships between objects such that the need for effecting changes to objects "downstream" may be recognized, propagated, and executed. In addition, if such propagation results in an invalid or inconsistent state of the model, the entire change must be reversed.

Model Persistence—State information for objects in a model must be maintained across editing sessions. Accordingly, the objects must be dynamically reinstated each time the CMS is used to view or manipulate the model.

Project and Model Management—A CMS must maintain the integrity of a model. Accordingly, mechanisms are required to: lock portions of the model to regulate multi-user access; control revision access; create and manage parallel development to the same model; merge changes from multiple users on the same model; permanently identify specific versions of constituent models of a project as contributing to a particular state of the project; and regulate access to the database according to graduated security levels.

Distributed Components—To help prevent data obsolescence, a CMS must allow for having portions of the model distributed out to those parts of an organization (or remote vendor locations, subcontractors, etc.) where they are most easily maintained. At the same time, a "live connection" to the distributed portion must be maintained in each model where it is referenced.

The present invention comprises a computerized modeling system ("CMS") that electronically models engineering information for design, analysis, manipulation, simulation, visualization, integration, decomposition, storage and retrieval. The present invention is highly suited for engineering environments such as mechanical engineering; structural engineering; electrical engineering; civil and roadway engineering; plant design, layout, and operation; building engineering and construction; facilities planning and maintenance; mapping; and geo-engineering; among other things.

To address the requirements discussed above, the preferred embodiment of the present invention includes an object-oriented schema implementation programming language, a compiler, a linker, and a run-time system. The programming language is largely based on the C and C++ programming languages with certain CMS extensions as will be described below, and is employed to write schema programs that are compiled using the compiler. The output of the compiler is an object file. The linker combines a group of object files into an executable program that is portable across many platforms, where each platform has a run-time environment tailored to that platform. Each program may also be a shared library. If so, the program exports references to classes, functions, and variables. Other programs can have references to these classes, functions, and variables resolved at run-time. A program may both import and export references. That is, the program may use other shared libraries and may serve as a shared library for other clients. A schema may comprise a set of such programs. The present invention includes schemas for general-purpose geometric modeling as well as schema for interfacing to industry standard exchange formats such as "MicroStation DGN", "AutoCad DWG", and "STEP".

The schema programs model information relevant to a predetermined domain. Such domains include engineering domains and other domains. The "schemas" represented by the schema programs include multiple "classes", each of which defines a type of component that may be placed in a model. "Objects" or "instances" are created or "instantiated" from each class, where each object is placed in the model and represents the occurrence of a component for a specific purpose in the model. Each class includes a specification of the data ("variables") held by each instance of the class, plus the program code ("methods") that may be employed to manipulate such variables.

The objects in a model are stored in one or more repositories or "stores". Related stores are logically grouped into a "project" which generally corresponds to a physical project (engineering or otherwise) in the real world. Projects are managed as a single unit by the CMS and are stored in a "project database", generally on a networked server, so that concurrent access can be granted to multiple users of the project.

To initiate a user session, a user executes a query of the project database to extract a subset of the project (i.e. a number of related objects) from the project database into a local database. Since the format of the objects in the project database and in the local database is not necessarily the same, translation may be necessary. The extraction is considered a long-term transaction to the project database such that during the user session no further interaction with the project database is required. If changes or additions are made to the extracted model objects during an editing session, such changes and additions may be posted to the project database at the end of the user session, at which time conflicts that have occurred due to changes by other users are resolved.

Since objects in a project database are defined and interpreted by the combination of instance data and class methods, instance data cannot be interpreted without the corresponding schema. Accordingly, to maintain the integrity of the project data, it must never be possible to encounter an instance without the corresponding schema.

For this reason, the CMS of the present invention treats not just the geometry but also the programs that comprise a schema as components of the project database, as with the instance data. Accordingly, whenever an instance of a class is created in a project database, the schema of the created instance is also copied into the database. Thus, whenever instances of that class are encountered in future sessions, the schema is loaded into memory from the project database.

A benefit of an object-based CMS is that information may be shared with other object-based programs by publishing appropriate interfaces. There are several standards proposed for the mechanism by which objects make requests and receive responses from interfaces of other objects. Two such standards are the Common Object Request Broker Architecture (CORBA) proposed by a vendor consortia including Hewlett-Packard Corporation, IBM Corporation, and others, and Component Object Model (COM) from Microsoft Corporation.

SUMMARY OF THE INVENTION

The present invention includes a computer system for modeling, where the computer system has a storage device, first and second platforms, a portable persistent model, and first and second platform-dependent computerized modeling systems (CMS). The first and second platforms are interfaced to the storage device, and each platform provides system-dependent services. The first platform has a first type of operating system and a first type of computer hardware including a first memory, and the second platform has a second type of operating system and a second type of computer hardware including a second memory.

The portable persistent model resides in the storage device in a platform-independent format, and includes persistent component objects. The first platform-dependent CMS resides in the first memory of the first platform and the second platform-dependent CMS resides in the second memory of the second platform. Each CMS provides CMS services including retrieving the model from the storage device, manipulating the model, changing the model by adding and removing persistent objects, and persistently saving the model to the storage device.

In the present invention, each platform-dependent CMS includes a static kernel and a dynamic framework. The static kernel executes on the platform and interfaces to the operating system and the computer hardware, and provides services necessary to load and execute CMS services and to interface to the platform services. The dynamic framework executes on the platform and interfaces to the kernel, provides a platform-independent visual interface between the CMS and a CMS user, and employs the services of the kernel.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Architecture

Figure 1:
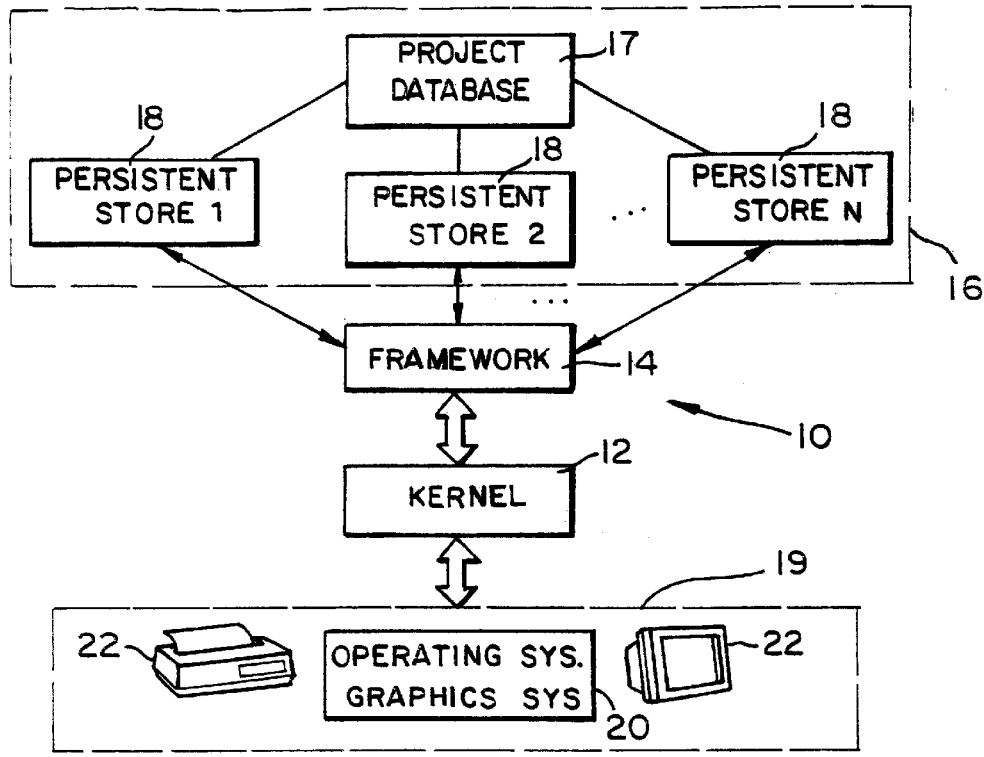
FIG. 1 is a block diagram of the architecture of a CMS in accordance with a preferred embodiment of the present invention.
Figure 2:
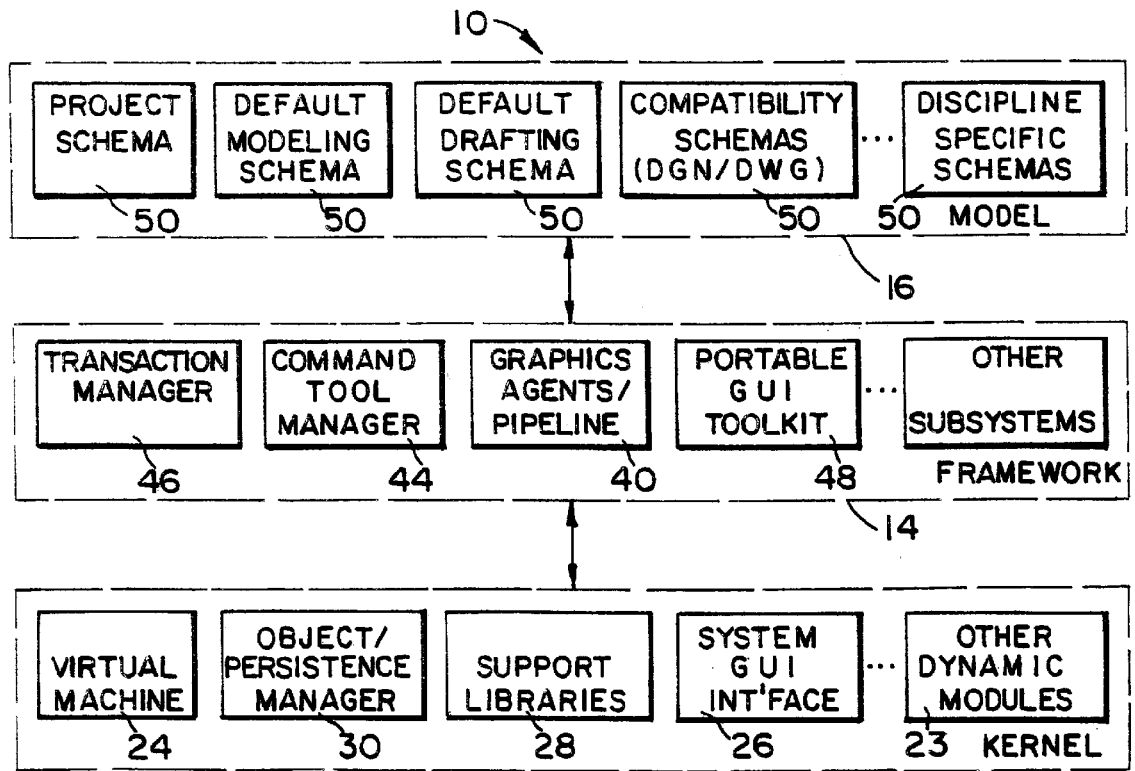
FIG. 2 is a more detailed block diagram of the model, framework, and kernel of the CMS shown in FIG. 1.

Referring to FIG. 1, the present invention includes a CMS 10 having an architecture that can be viewed as several distinct layers including a static kernel 12, a dynamic framework 14, and a portable persistent model 16 constructed from a set of schemas 50 (as seen in FIG. 2) and stored in one or more persistent stores 18 of a project database 17. Each layer serves a separate purpose and is constructed using different tools. Such architecture is designed to accomplish the goals set forth above for efficiency, portability, and flexibility.

At the lowest level, the kernel 12 provides the services necessary to load and execute the higher levels, as well as the interface to the (necessarily system-dependent) services of the underlying platform 19. As seen, the platform 19 includes the operating system and graphics system 20, and computer hardware 22. As should be understood, the computer hardware 22 includes memory such as RAM memory in which the kernel 12, the framework 14, and at least a portion of the portable persistent model 16 reside at runtime, and at least one storage device such as a hard drive or an optical drive in which the portable persistent model 16 is stored. In the preferred embodiment of the present invention, the kernel 12 is written in the well-known "C" and "C++" programming languages, is compiled using vendor-supplied tools into a native code appropriate to the platform 19, and is therefore platform specific for each of several platforms 19. The kernel 12 executes at full machine level speed and is therefore the most efficient software layer.

The kernel 12 provides services to the higher levels by exposing a function call-based application programmer interface ("API"). As should be understood, the API has "native code" functions that are accessed via direct calls from the next higher level software layer (i.e. the framework 14). The addresses of the native code functions in the kernel 12 are resolved using Dynamic Link Specification (DLS) files provided with the kernel 12. Higher level layers can presume that the kernel 12 will always be present to provide services, despite the fact that the kernel 12 is non-portable. The kernel 12 can be extended by loading additional dynamic modules 23 with associated DLS files; however higher levels must test for the presence of these modules before using them.

As seen in FIG. 2, the kernel 12 includes a CMS virtual machine 24, as will be described below, and an interface 26 to a system graphical user interface ("GUI"). Additionally, the kernel 12 includes various support libraries 28 that are necessary for nearly all CMS programs. These include libraries for: file and resource I/O, configuration management, general vector and matrix algebra, memory management and diagnostics, system event handling, macro language interface, solids modeling, and graphics display, among others.

The kernel 12 also includes an object/persistence manager 30 responsible for the allocation, references, and persistence of all objects in the model 16. Whenever a new object is created, the object/persistence manager 30 creates an object descriptor for the object. As will be described below, all references to an object are through its object descriptor. The object/persistence manager 30 can therefore manage "object faulting" when objects are reloaded from disk, as will be described below, as well as the synchronization and data manipulation required to establish connections to objects on remote computers.

The framework 14 provides a platform-independent visual interface between the CMS 10 and a CMS user. The framework 14 uses the services of the kernel 12 and incorporates the logic necessary for employing those services to address the CMS requirements described above. Although the framework 14 of the preferred embodiment of the present invention is primarily directed at engineering-type modeling, one skilled in the art will recognize that different frameworks could be developed using the same basic concepts to address related, tangential, or even different business problems with similar requirements for portability, persistence, and data modeling.

Figure 3:
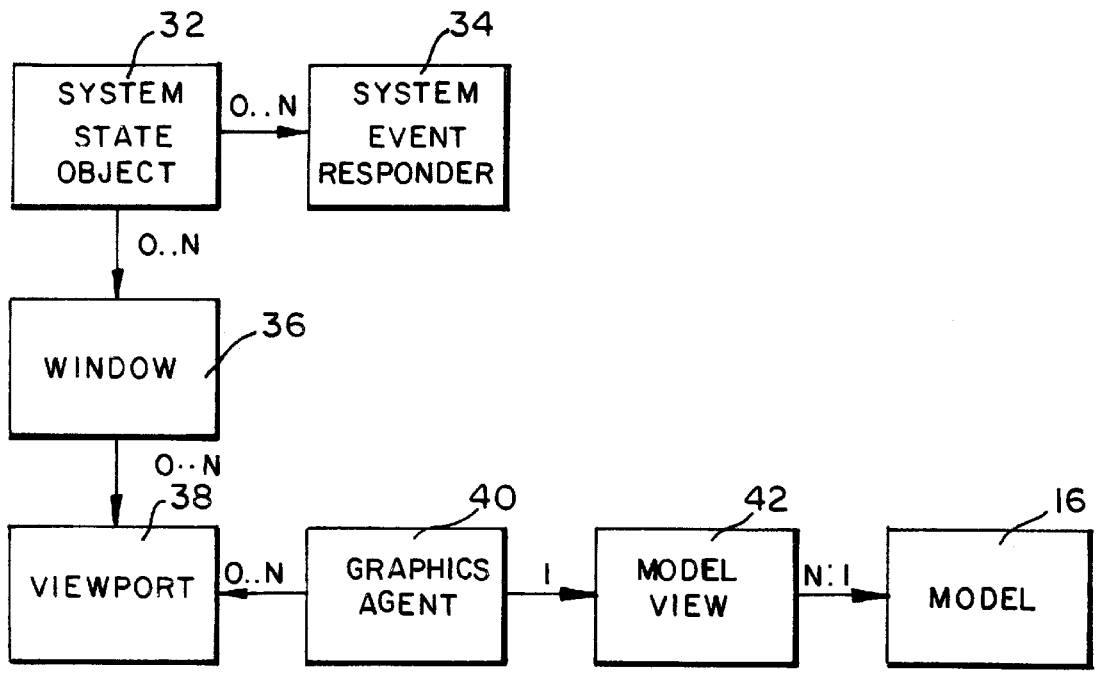
FIG. 3 is a block diagram showing elements included and/or accessed by the framework of FIGS. 1 and 2.

Referring now to FIG. 3, the framework 14 is a visual interface that includes and/or accesses a system state object 32, system event responders 34, windows 36, viewports 38, and graphics agents 40, among other things. The framework 14 is written in the object-oriented schema implementation programming language referenced above for maximum extensibility and maintainability. However, the framework 14 is not necessarily portable, may have different behavior on different platforms 19, and is not saved in the project database with the instance data for a project.

The system state object 32 is the root object of the framework 14 and is the known point for queries to determine the current state of the framework 14. As should be understood, the system state object 32 holds all of the system level state information that affects the behavior of the framework 14 and ensures that such information is always consistent and accurate. For example, the system state object 32 holds a reference to the current project object, a list of the current system event responders 34, and a list of all open windows 36 on the screen, among other things. The system state object 32 is created as part of the initialization of the framework 14 itself.

Each of the event responders 34 is designed for and executed in response to the occurrence of a specific event triggered by the user. Multiple responders 34 can watch for the same event, although typically only one will actually handle (process) the event.

Windows 36 are employed as the interface between the user and the CMS 10 through which all interaction takes place. Typically, the window 36 is a rectangular region on the screen and provides a consistent visual interface on all platforms 19. Windows 36 are implemented using services provided by the graphics subsystem in the kernel 12. As should be understood a window 36 may be re-sized by the user or by method calls from a program, may be minimized or maximized, and may be visible or occluded depending on relations with other windows 36.

Windows 36 are notified asynchronously when certain events occur, either as a result of an input from the user or as a byproduct of actions taken by other programs. Windows 36 process certain of these events themselves and also maintain a list of responders 34 to further process the events that occur within their respective interiors. As is known, events are passed to each responder 34, in turn, until one of them returns a status indicating that the event has been handled.

Viewports 38 are rectangular drawing regions into which programs display graphics output. The viewport 38 provides a graphics output interface that is accessible from within the framework 14, and that is independent of the window system and actual graphics device. Different kinds of viewports 38 are used to output to a window 36, to output directly to a non-window device for displaying graphics in other applications, and to output to a printer or plotter driver. In the first case, a viewport 38 is normally mapped to a specific subregion of a window 36, and more than one viewport 38 can be displayed in a single window 36. In each case, only the implementation of the specific viewport 38 is changed. Preferably, each viewport 38 contains methods for drawing vectors, polylines, arcs, ellipses, B-Splines, text, and filled regions, among other things; an interface to a set of "active symbology" methods that manage color, line style, endcaps, line joins, line width, and fill parameters for the viewport 38.

A graphics agent 40 provides the link between a model view 42 (i.e. a particular view of the model 16 or portion thereof as requested by the user) and an output device (not shown) such as is represented by a viewport 38. As is known, the graphics agent 40 provides a consistent sophisticated set of drawing primitives that can be used to render any image. If a correspondingly sophisticated viewport 38 is used, primitives may be sent directly to the viewport 38 after transformation into viewport coordinates. If a less sophisticated viewport 38 is used, it is the responsibility of the graphics agent 40 to translate the primitives into the less sophisticated viewport primitives for display. Preferably, the graphics agent 40 holds an optimized version of a graphics pipeline for transformation from model to screen coordinates and vice versa.

A graphics agent 40 specialized for locate testing ("locate agent") (i.e. locating what object a user is pointing at, usually with a mouse) tests each primitive (i.e. each graphic display of an object in the model 16) for its location relative to a test point stored in the locate agent 40 and accumulates a list of "hits" within a specific range of the test point. From the list of hits, the locate agent 40 selects for a "likely hit" which is then made available from the locate agent 40.

The process of creating or manipulating objects generally requires a series of actions that precipitate visual feedback, confirmations, and qualification of inputs. It is therefore necessary to maintain the "state information" while the user goes through the steps necessary to fully indicate his intentions and refine incorrect or unintentional interpretations. To accomplish such a goal, and referring again to FIG. 2, the framework 14 of the CMS 10 of the present embodiment includes a command tool manager 44 that controls the process of manipulating the model 16 by way of a set of command tools (not shown).

As is known, each command tool has an expected set of inputs from which emanate predictable results. A specific command tool is only concerned with its set of expected input and can ignore all other inputs. In a typical CMS it is frequently desirable to suspend the implementation of one command so that another intermediate action can be taken. For example, while constructing physical objects based on existing objects, or when modifying an existing object, it may be desirable to visually zoom in on specific areas of interest in the model 16 for closer examination. However, the input required by the zoom command (a data point indicating the region of interest) will likely conflict with the input expected by a construction/modification command. It is therefore necessary to start the implementation of the zoom command before the implementation of the construction/modification command has completed.

For this reason, the CMS 10 of the present embodiment preferably stores an ordered list of command tools, each having a specified priority. Events are passed to each command tool in order of priority until one returns a status indicating that the event has been handled. Command tools that control intermediate actions, such as the zoom command, are assigned a higher priority than construction/modification tools. Other high-priority command tools "filter" or modify the inputs to enforce user desired constraints such as locking coordinates to a series of grid points in space, vertices, intersections, or other critical points of existing geometry; and setting distances to known values; among other things.

As seen in FIG. 2, the framework 14 of the CMS 10 of the present embodiment also includes a transaction manager 46 that keeps track of all of the objects involved in a transaction and that saves a copy of the original conditions of such objects. Preferably, a transaction is defined as a series of related modifications or additions to objects in the model 16. A single transaction is typically associated with a single completed execution of a command tool. If, at a subsequent time, the user decides that he is not satisfied with the result of a transaction, he can request that the transaction manager 46 "undo" the change. Also, if an error occurs during the course of processing a transaction, the transaction manager 46 preferably can "unwind" the, errant transaction so that the model 16 is unaffected thereby.

The transaction manager 46 also handles transient objects displayed on the screen for visual feedback during the processing of a command tool. The transaction manager 46 removes the transient objects from the screen when the command terminates.

The framework 14 of the CMS 10 of the present embodiment also includes a portable graphical user interface ("PGUI") tool kit 48 that provides a consistent set of graphical user interface ("GUI") tools independent of the underlying platform 19. A PGUI dialog window is based on a framework window 36 and is therefore system independent. PGUI dialog items are implemented entirely within the PGUI system and do not depend on windows or other dialog items operating system and graphics system 20. Accordingly, applications that use the dialog boxes and dialog items from the PGUI 48 do not require source code changes to operate on different platforms 19.

The framework 14 also provides operating system level functionality independent of the underlying platform 19. Such functionality includes support for timers, exception handling, inter-process communication, shared libraries, directory searching, and file access.

Figure 4:
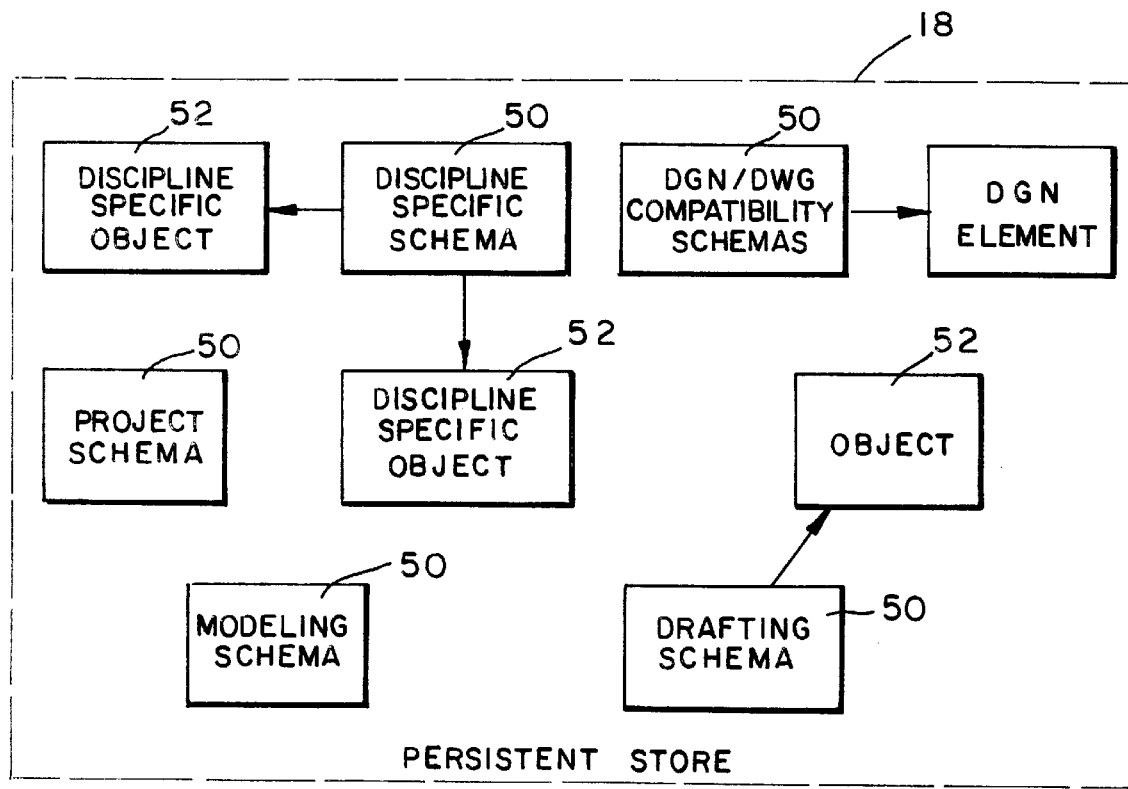
FIG. 4 is a block diagram showing schemas included with the model of FIGS. 1 and 2.

As seen in FIG. 2, the portable persistent model 16 is constructed from one or more schemas 50 including a project schema, a modeling schema, a drafting schema, compatibility schemas, and other discipline- or domain-specific schemas. As should be understood, a schema 50 is a set of tools relevant to a particular functionality or domain or discipline, where multiple objects 52 defined by multiple schemas 50 can be combined into a single model 16. As seen in FIG. 4, multiple schemas 50 may be stored in a single persistent store 18 and objects 52 defined by a schema 50 are stored in the persistent store 18 with the defining schema 50.

Programming Language

Figure 5:
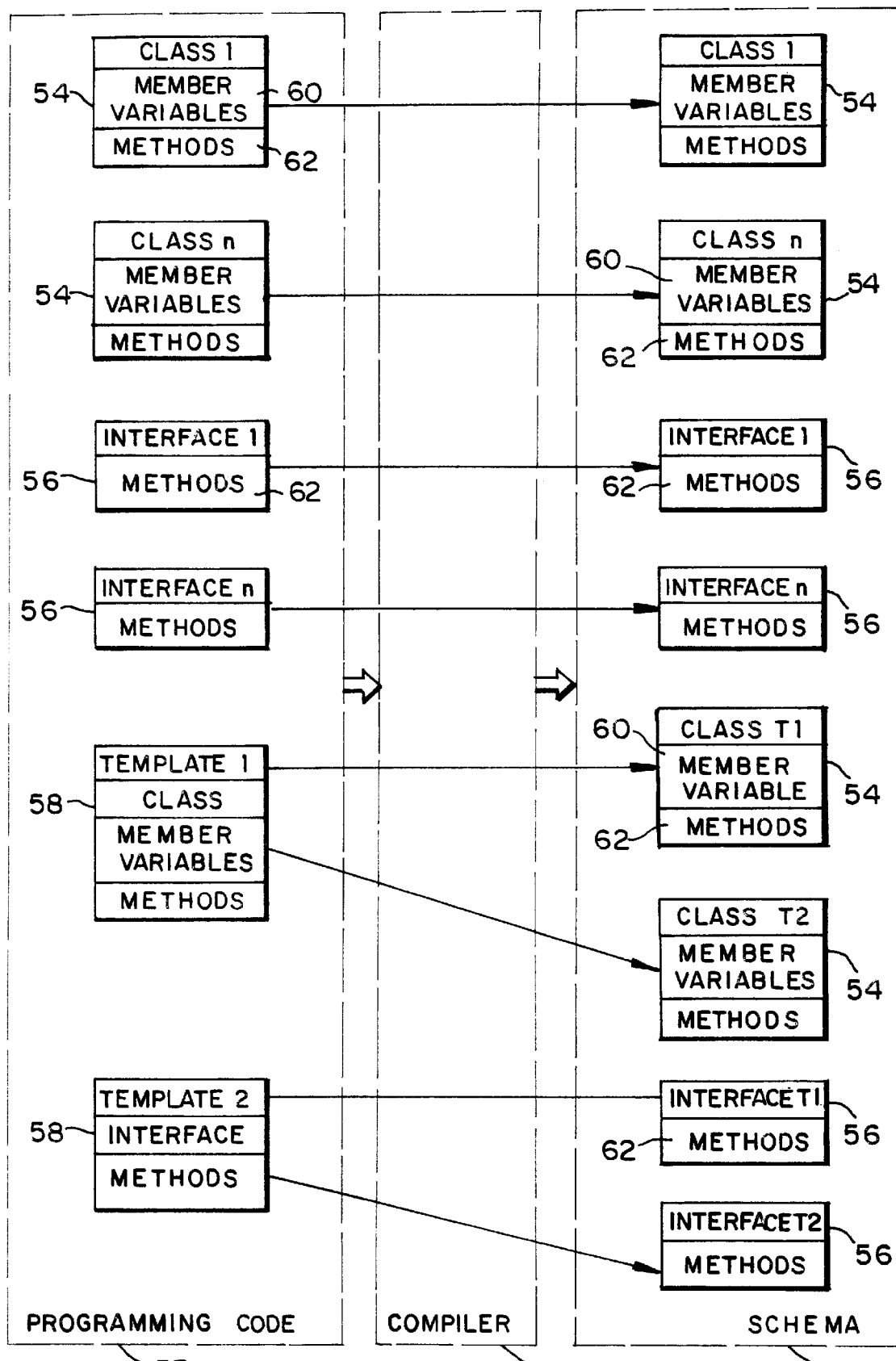
FIG. 5 is a block diagram showing key language features of the programming language of the present embodiment, including classes, interfaces, and templates.

The present invention includes an object-oriented schema implementation programming language 53, as seen in FIG. 5. The programming language 53 is designed to address several issues:

Unknown objects—The trend in the computer industry is toward small object-oriented program portions that can be used in many different programs. Although such program portions provides considerable power for assembling a program from component software, such a program is fragile since the availability of all of the program portions is absolutely necessary. As should be evident, ensuring that all of the required program portions are available to the program is problematic. To resolve this issue, the programming language 53 of the present embodiment requires that created program portions be stored with the databases the program portions create. The stored program portions are formatted in a manner known to the kernel 12 and are therefore executable on all platforms 19 for which a kernel 12 has been supplied. Thus, the software required to manipulate the data is always available and never unknown.

Portability—It is important that created program portions and data be movable from platform 19 to platform 19 without compatibility issues arising. That is, the program portions and data must operate in the same manner regardless of the particular configuration, system software, and hardware of the platform 19. The user must be able to copy the data and program portions to another platform 19 and know that the data and program portions will move as a unit and work on the other platform 19.

Persistent relationships among objects—Typically, when data is written to a file and read back, all of the numeric data and all of the strings are read back properly, but complex relationships among the data may be lost. If the complex relationships are maintained (i.e. made "persistent"), it is typically due to unusual effort by programmers and the effort only solves the problem for a few relationships or for the object implementations developed by one group of programmers. In the present embodiment, a persistence mechanism is provided to maintain such complex relationships across user sessions.

Interoperability—Program portions must be usable together even though the portions were developed independently.

Encapsulation—Program portions must be as isolated ("encapsulated") as possible while still providing functionality to other program portions. As should be understood, encapsulation means hiding as much information as possible and allowing other program portions to access information only when absolutely necessary and only programmatically, not by direct reference. Encapsulation is required to allow long term independent evolution of the program portions, and for isolating program errors as they arise.

Object-oriented—New objects 52 must be introducible into a CMS, and existing program portions must be able to employ the new objects 52 without any modification. Therefore, objects 52 must be able to respond to standard actions required by existing program portions.

Specialization of components—A need often arises to create a new type of object 52 that is a specialized version of an existing object 52. It can be assumed that any method that operates on the existing object 52 can also operate on the new type of object 52, and that the new type of object 52 also has some additional characteristics not present in the existing object 52.

Preferably, programs employed by the CMS 10 of the present embodiment are organized as shared libraries. Typically, one shared library implements a group of functionality or implements the behavior of a few classes in a schema 50. The ability to implement programs as shared libraries aids in encapsulation since everything but the public interface to a class can be limited to the small scope of a shared library. Shared libraries also support interoperability since different groups of programmers can provide shared libraries that operate together. Further, shared libraries help to solve the unknown objects issue discussed above since the programming language 53 of the present embodiment identifies the shared library that implements a class and copies the entire shared library to the data file that contains the persistent image of objects 52 instantiated from the class.

As shown in FIG. 5, the key language features of the programming language 53 of the present embodiment that support object-oriented programming are classes 54, interfaces 56, and templates 58.

As was discussed above, in terms of the run-time CMS 10 of the present embodiment, a class 54 is part of a schema 50 and defines an object 52 that may be instantiated from the class 54, where the instantiated object 54 can be placed in the model 16. In terms of the programming language 53 of the present embodiment that is compiled by a compiler 55 at compile-time to produce the schema 50, a class 54 defines member variables 60 (i.e. types of data) common to each object 52 and the methods 62 (i.e. functions) that operate on the member variables 60. The member variables 60 are employed by the CMS 10 to record the state of an object 52 instantiated from the class 54, and the methods 62 are employed by the CMS 10 to access and possibly modify the state of an object 52. Every object 52 is an instance of some class 54.

Figure 6:
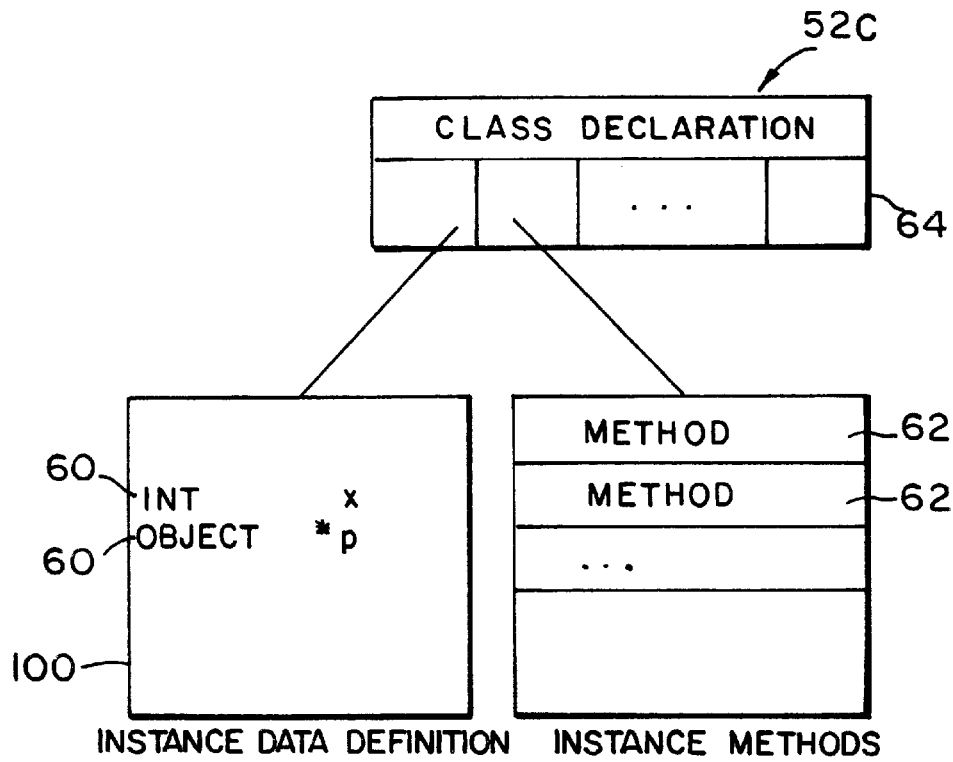
FIGS. 6 and 7 are block diagrams showing a class definition and an interface definition, respectively, in the preferred embodiment of the present invention.

In the programming language 53, a "class declaration" defines a class 54 by listing the member variables 60 and methods 62 for the class 54. As seen in FIG. 6, the class declaration 64 for the class 54 declared the member variables 60 and the names of the methods 62 of the class 54. At run-time, the class declaration 64 is embodied in a class object 52C for the class, as will be described below.

The following example illustrates a class declaration 64 for a simple "Door" class in the programming language 53 of the present embodiment: class Door : Object

```
{
// Declare member variables
    double height, width;
// Declare methods
    Door        *setDimensions (double height, double width);
    double      getHeight () const;
    double      getWidth () const;
};
```

As one skilled in the art will recognize, the above example is written in a "C++" programming language style. From the class declaration 64, the Door class has 'height' and 'width' member variables and methods 'setDimensions', 'getHeight', and 'getWidth'. As should be understood, the source code for the methods 62 is typically not included in the class declaration 64, but instead is included elsewhere in the library having the class declaration 64.

Classes 54 may be derived from other classes 54, both logically and as they are expressed in the source code. For example, a "StormDoor" class may be derived from the Door class. As such the StormDoor class will have all of the properties of the Door class, plus properties that are specific to storm doors. In such a case, Door is a "base class" and StormDoor is a "derived class". Everything that is an attribute of Door is also an attribute of StormDoor. Common terms for the process of creating a new class 54 from an existing class 54 are specialization, derivation, and inheritance. Since StormDoor inherits all of the member variables 60 and methods 62 from Door, there is no need to declare them in the StormDoor class declaration. An example of the class declaration 64 of StormDoor is:

```
class StormDoor : Door
{
int         numberScreenpanels;
boolean     glassPanelsAllowed;
int         getNumberScreens ();
int         isGlassAllowed ()
};
```

From the class declaration 64, the StormDoor class has 'numberScreenPanels' and 'glassPanelsAllowed' member variables in addition to the member variables of the Door class and methods 'getNumberScreens' and 'isGlassAllowed' in addition to the methods 62 of the Door class. The statement "class StormDoor : Door" signifies that StormDoor derives from Door and that Door is a base class.

An interface 56 provides a way to logically group methods 62 independently of a class declaration 64. An interface 56 represents a logical grouping of methods 62 for some purpose that may be performed by a number of classes 54, even classes 54 that are not otherwise related.

A programmer often wants to require that an object 52 supports a set of methods 62, but does not want to restrict the object 52 to be a member of a specific class 54. It is much more powerful to allow the objects 52 to be a member of any of a variety of classes 54, provided that the classes 54 support the set of methods 62. Accordingly, in the present invention, interfaces 56 are provided as a tool for expressing such a relationship.

Figure 7:
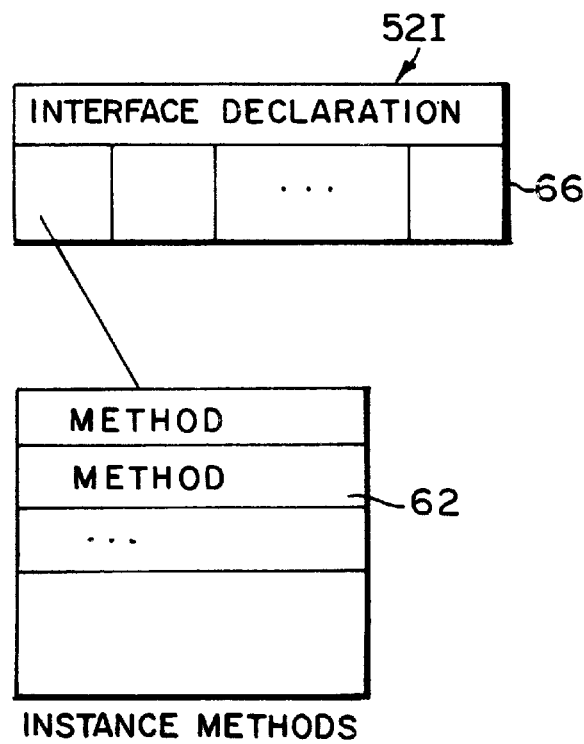

As seen in FIG. 7, the interface declaration 66 declares the names of methods 62 of the interface 56. An example of an interface declaration 66 is: interface Opening

```
{
Opening     *setDimensions (double height, double width)
double      getHeight () const;
double      getWidth () const;
};
```

From the interface declaration 66, the interface 'Opening' has the methods 'setDimensions', 'getHeight', and 'getWidth'. Any class 54 declared as supporting the interface Opening must implement all three of these methods 62 with the signatures defined in the interface declaration 66. At run-time, the interface declaration 66 is embodied in an interface object 52C for the interface 56, as will be described below.

One interface 56 can extend or derive from another interface 56. For example, the interface "FramedOpening" adds to the interface Opening: interface FramedOpening :

```
              Opening
{
FramedOpening   *setFrameDimensions.   (double height,
                                        double width);
double          getFrameHeight () const;
double          getFrameWidth () const:
};
```

In the programming language 53 of the present embodiment, a class declaration 64 uses the keyword 'implements' to mark the beginning of the list of interfaces 56 that the class 54 supports. Accordingly, for Door to support Opening, the first line of the declaration of Door would be changed to:
class Door : Object implements Opening
If a class declaration 64 for a class "Window" is:

```
class Window : Object implements Opening
{
// Declare member variables
double height, width;
int     numberPanes;
};
```

Then Wall could be declared as:
class Wall :

```
              Object
{
int         numOpenings;
Opening     *oOpenings;
};
```

As one skilled in the art would appreciate, oOpenings refers to a list including windows and doors. In this case, the use of the interface Opening has allowed the Wall class to refer to objects 52 that share the common characteristic that a Wall implementer cares about.

A class 54 supports a first interface 56: (1) if the class declaration 64 for the class 54 names the first interface 56 in an 'implements' clause; (2) if the first interface 56 is a base interface to a second interface 56 and the class declaration 64 for the class 54 names the second interface 56 in an 'implements' clause; or (3) if a base class 54 of the class 54 supports the first interface 56. An object 52 supports an interface 56 if the object 52 is an instance of a class 54 that supports the interface 56.

A template 58 provides a flexible programming technique for declaring classes 54 and interfaces 56. A template 58 is a declaration of a "shell class" or "shell interface" with some of the type information parameterized (i.e. not filled in). The parameterized type information is then "filled in" during compile-time according to other source code. For example, 'template 1' shown in FIG. 5 defines a shell class that has been filled in a first time to create 'class T1', and a second time to create a 'class T2'. Accordingly, while 'class T1' and 'class T2' are structurally similar, the actual components represented by each class 54 may be quite different.

Templates 58 are typically used for creating container classes. Consider a class 54 that manages lists of objects 52. Without templates 58, a programmer must either create implementations of the list for every type of object 52 that can appear in the list, or must implement the list class 54 in a way that bypasses type safety verifying algorithms typically present in a compiler 55. Templates 58 allow a programmer to implement a shell just once in the source code, and to let the compiler 55 make the template 58 work for all of the intended uses.

The programming language 53 of the present embodiment provides encapsulation through classes 54 and access control. All information representing the state of an object 52 is declared in the corresponding class declaration 64. A programmer may establish in the class declaration 64 what classes 54 and functions are allowed to change different parts of the objects 52 instantiated from the class 54.

A member variable 60 in a class declaration 64 may be declared to be "private", "protected", or "public". A private member variable 60 may only be accessed by methods 62 of the class 54 having the private member variable 60. A protected member variable 60 may only be accessed by methods 62 of the class 54 having the protected member variable 60 and by methods 62 of derived classes 54. A public member variable 60 may be accessed by any method 62. By declaring all of the member variables 60 in a class 54 to be private, the class 54 guarantees that all access to the state of an object 52 instantiated from the class 54 must be through the class methods 62.

Interfaces 56 increase encapsulation. The implementer of a class 54 does not even need to document the class declaration 64 to other developers if the class declaration 64 implements a documented interface 56. All access to the member variables 60 of the "hidden" class 54 may be had through the methods 62 declared in the interface 56 and declared in the resulting interface declaration 66.

Preferably, a class declaration 64 may grant complete access rights to other classes 54 and methods 62 by using a "friend" declaration. The friend declaration signifies that the specified class 54 or method 62 may access the member variables 60 of the class 54.

As should be understood, access control can also be managed through the 'package' statement. The package statement is interpreted at compile-time and declares that the source file being compiled is to be part of the program named in the package statement. All source files compiled with the same package statement have access to all of the member variables 60 of any class 52 implemented in that package. All of the object files generated from source files with the same package statement must be linked into the same program. Therefore, the package concept provides a tool for granting full public access to all code that is linked to the same program, but enforcing the standard access model to code that is not linked with the program.

Run-time Representation of Object-Oriented Data Types

Figure 8:
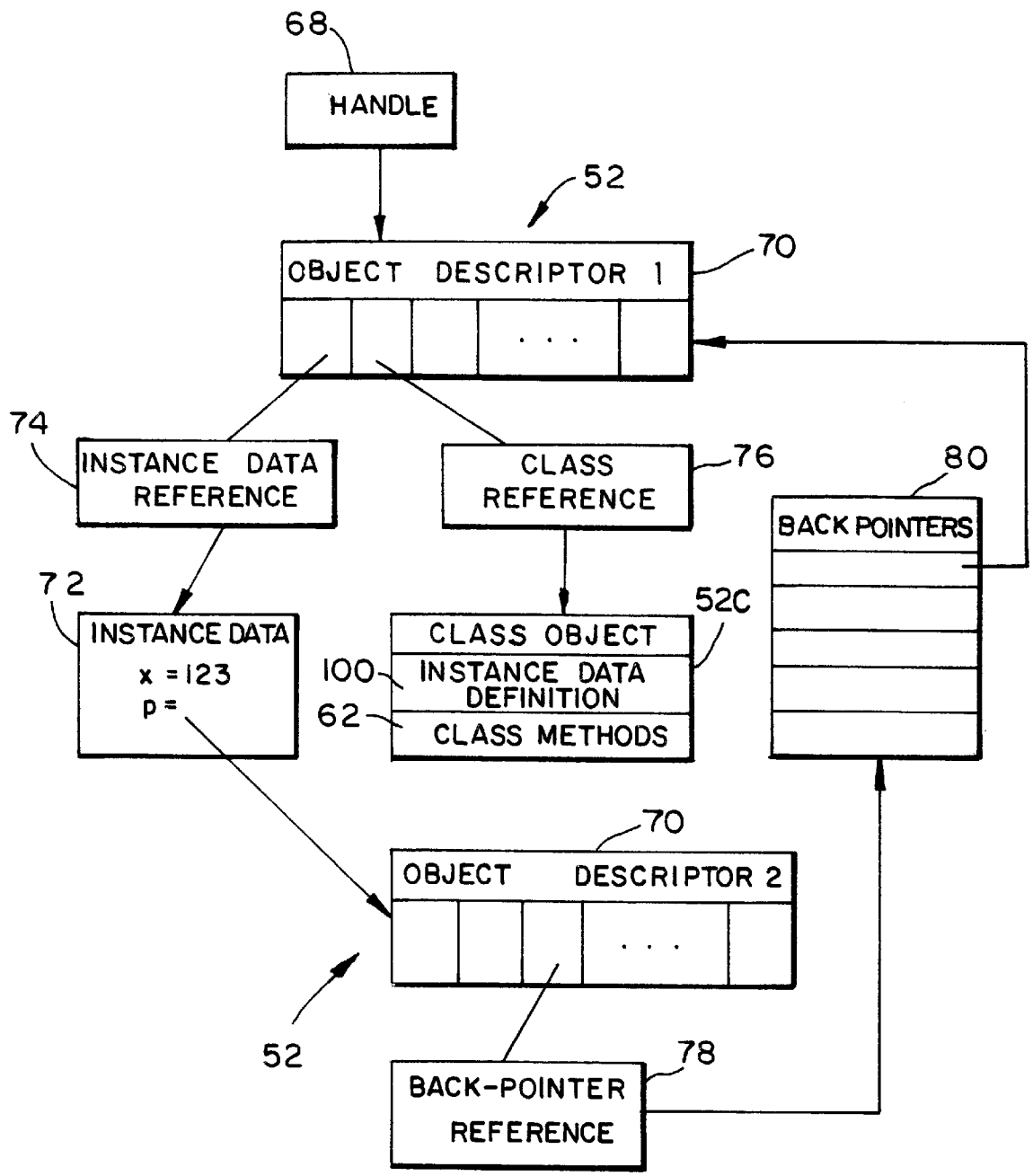
FIG. 8 is a block diagram showing the run-time interaction between dependent objects in the preferred embodiment of the present invention.

Referring now to FIG. 8, every "resident" object 52 (i.e. fully loaded into memory) is represented during run-time by three groups of information: a handle 68, an object descriptor 70, and the object 52 itself as represented by instance data 72 for such object 52. The handle 68 is a reference to the object descriptor 70. The object descriptor 70 contains an instance data reference 74 to the memory location of the instance data 72 for the object 52, a class reference 76 to a class object 52C associated with the class 54 from which the object 52 was instantiated, flags that indicate the state of an object 52, and a back-pointer reference 78 to a list of back-pointers 80, where each back-pointer in the list 80 points to another object 52 that has a reference to (i.e. is dependent on) the object 52. As should be understood, the instance data 72 of the object 52 contains the data declared in the member variables 60 of the class declaration 64.

Such object architecture allows an object 52 to have a reference to a "potential" object 52 (i.e. not loaded into memory) since such reference is to an object descriptor 70 and not to a memory location. When the CMS 10 tries to access data from a potential object 52, the potential object 52 is faulted in and made resident (i.e. loaded into memory) if necessary. Furthermore, by referring to an object descriptor 70 rather than a memory location, an object 52 may be moved from one memory location to another without the need to adjust all references to the object 52. Instead, only the reference to the memory location in the object descriptor 70 need be updated.

The class object 52C represents the class 54 at run-time and embodies the class declaration 64 for the class 54 (as seen in FIG. 6). Accordingly, the class object 52C contains all the methods 62 invoked by all the objects 52 instantiated from that class 54. With each object 52 having a class reference 76 to a class object 52C, it is always possible to determine at run-time whether an object 52 belongs to a certain class 54.

Since a class object 52C is an object 52, the class object 52C must have a handle 68 and an object descriptor 70. The class object 52C contains information describing how the class 54 fits into any class hierarchy, a reference to the base class 54 for the class 54 (if one exists), the size of objects 52 of the class 54, a dispatch table 84 (shown in FIG. 10) that indexes the methods 62 associated with the class 54, and a reference to a list of interfaces 56 implemented by the class 54.

Like any other object 52, a class object 52C can be used to invoke methods 62. Accordingly, class objects 52C are employed to instantiate new objects 52 from the class 54. That is, class objects 52C are the factories that create new instances of objects 52. The methods 62 invoked by a class object 52C to instantiate an object 52 are referred to as class methods or factory methods.

Further, the object descriptor 70 of a class object 52C must also point to a class object 52C ("meta class") for the class 54. Just as a class object 52C contains all the methods 62 invoked by all the objects 52 instantiated from that class 54, so too must there be a meta class 54 that contains all the methods 62 invoked by the class object 52C. A meta class 54 contains the description of the associated class object 52C and a reference to a dispatch table 84 of methods 62 that can be invoked using the class object 52C.

Interfaces 56 are also represented by objects 52 at run-time. AE; should be understood, an interface object 52I (not shown) represents an interface 56 at run-time and embodies the interface declaration 66 for the interface 56 (as seen in FIG. 7). Accordingly, the interface object 52I refers to all the methods 62 declared in connection with the interface .56. An interface object 52I also contains the name of the object 52I and a reference to the list of incorporated interfaces 56. Since interfaces 56 are not classes 54 and are not used to instantiate objects 52, interface objects 52I do not invoke methods 62 and no corresponding "meta interface" is necessary.

The run-time class; objects 52C and interface objects 52I allow programs to perform run-time type checking, or "dynamic casting". With dynamic casting, the CMS 10 can determine whether an object 52 is an instance of a specified class 54 or whether the object 52 is from a class 54 that supports a specified interface 56.

Figure 9:
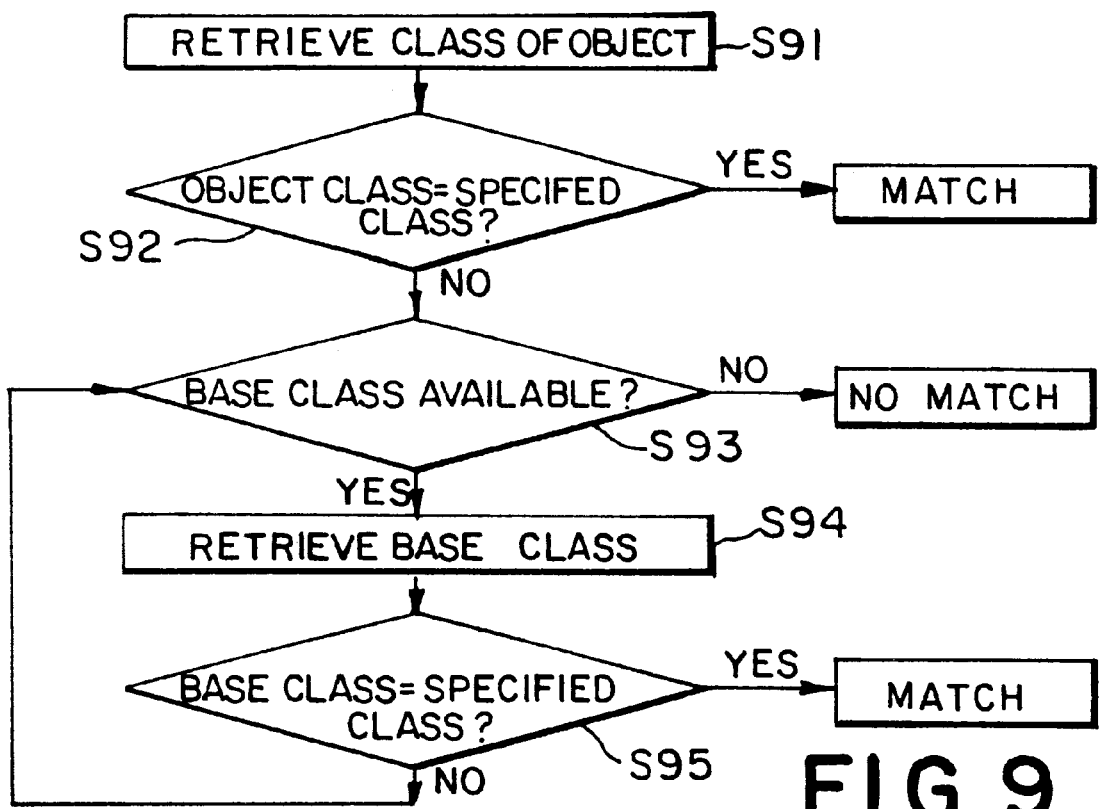
FIG. 9 is a flow diagram showing the process of dynamic casting in the preferred embodiment of the present invention.

In a dynamic cast, and referring now to FIG. 9, the CMS 10 retrieves the class reference 76 from the object descriptor 70 for the object 52 (S91) and compares that to the class 54 specified in the query (S92). If they are the same, then the object 52 is an instance of the specified class 54. Otherwise, the base class reference 76 in the class object 52C for the object 52 is retrieved and examined to determine whether there is a base class 54 for the class 54 (S93), and if so, the base class 54 for the class 54 is retrieved (S94). The CMS 10 then compares the base class 54 to the specified class 54 (S95). If these match, then the object 52 is an instance of the specified class 54. The comparisons continue until either a match is found or the root of the class hierarchy has been reached. If the process terminates without finding a match, then the object 52 is not an instance of the specified class 54. As one skilled in the art should now realize, the process is similar if the dynamic cast is to determine if the object 52 is from a class 54 that supports a specified interface 56.

If experience shows that there are too many classes 54 or interfaces 56 for the aforementioned recursive search technique to work efficiently, then various optimization techniques may be used. For example, the CMS kernel 12 could provide a unique selector index to each class object 52C and interface object 52I and attach a data structure to each of such objects 52C, 52I, where each data structure is a list of all classes 54 and interfaces 56 supported. The data structures would be organized to allow for quick access using the selector index, allowing the CMS kernel 12 to quickly examine a data structure to determine if an object 52 is a member of a certain class 54 or supports a specific interface 56. The technique for this would be similar to the technique used for method dispatching (discussed below).

The CMS 10 of the present embodiment allows for polymorphic methods 62. As should be understood, a method 62 is polymorphic if the behavior of the method 62 depends on the object 52 that invokes the method 62. In the CMS 10 of the present embodiment, "dynamic binding" is employed to implement polymorphic methods 62.

Any language supporting polymorphic methods 62 requires some sort of dynamic method dispatching. As should be understood, when a reference to an object 52 is employed to invoke a method 62, the system must use that reference to find the methods 62 associated with the object 52, and then must use the method name itself to find the proper method implementation in a table of methods.

Figure 10:
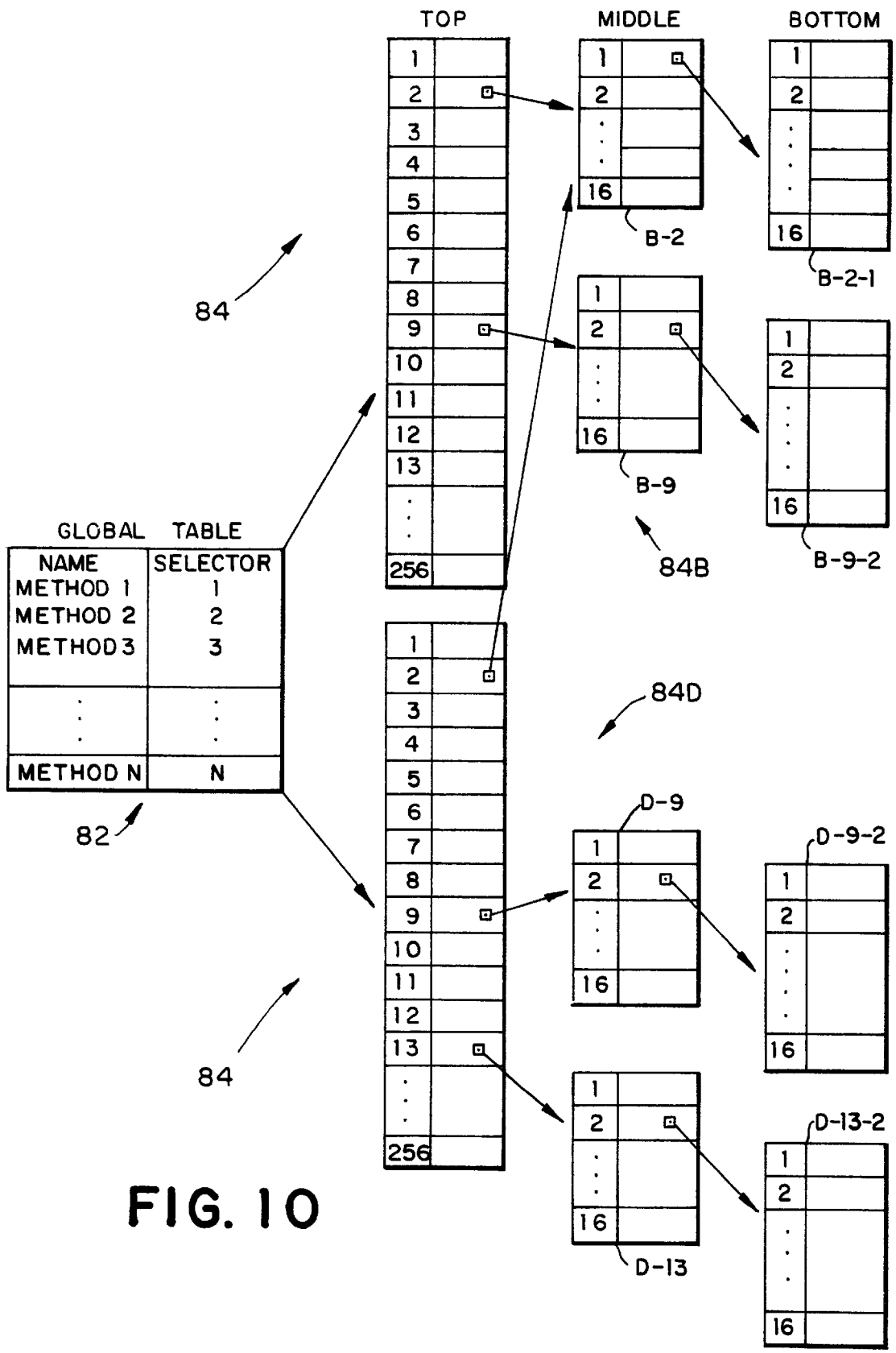
FIG. 10 is a block diagram showing a global table of method selectors and a dispatch table for a class derived from the global table in the preferred embodiment of the present invention.

In the CMS 10 of the present embodiment, every program is preferably provided with a list of all of the methods 62 that the program uses and all of the methods 62 that the program implements. When the program is loaded at run-time, the CMS 10 runs through the list trying to find each of the method names in a global table of methods 82, as seen in FIG. 10. If a method name is not found, such method 62 is added to the global table 82 and a system-wide index or selector value is associated with that name in the global table 82 and is also stored in program memory. The selector for that method 62 is then placed at every reference to the method 62 in the run-time program.

Since the method 62 has the same selector systemwide, and since every object descriptor 70 has a reference to a class structure having a dispatch table 84 for the class 54 of the object 52, the method 62 is selected from the dispatch table 84 in the CMS 10 of the present embodiment by constructing the dispatch table 84 during run-time based on the global table 82. Since the dispatch table 84 is constructed at run-time and not at compile-time, it is not necessary to re-compile all of the clients of a class 54 when a method 62 is added to the class 54.

Preferably, the dispatch table 84 for each class 54 includes the methods 62 of the interfaces 56 implemented by the class 54. Accordingly, there is no need for a separate dispatch table 84 for each interface 56, as is required in "C++" and other object-oriented languages. With such an arrangement, an object 52 can invoke a method 62 even if the object 52 only references an interface 56 that the class 54 of the object implements.

If a dispatch table 84 was merely a copy of the global table 82, the dispatch table 84 would be relatively large and would contain much unnecessary information about methods 62 the class 54 of the dispatch table 84 does not implement. Removing the un-implemented methods 62 from the dispatch table 84 would still leave a large structure that is relatively unpopulated. Accordingly, the dispatch table 84 of the CMS 10 of the present embodiment is based on a three-tiered sparse array, as shown in FIG. 10.

As seen, the bottom tier may contain a plurality of lists, where each list has up to 16 entries and each list entry contains a method descriptor if the corresponding method 62 from the global table 82 is implemented by the class 54 of the dispatch table 84. As should be understood, a bottom tier list exists only if necessary to contain a method descriptor.

The middle tier may also contains a plurality of lists, where each list has up to 16 entries and each list entry points to a list in the bottom tier if such bottom tier list exists and contains a method descriptor. As with a bottom tier list, a middle tier list exists only if necessary to contain an entry that points to a bottom tier list.

The top tier contains a single list having up to 256 entries, where each entry points to a middle tier list if such middle tier list exists and contains an entry that points to a bottom tier list. Presuming that a class 54 implements at least one method 62, the dispatch table 84 for the class would have one top tier list, at least one middle tier list, and at least one bottom tier list.

As should now be understood, for each method 62, the method selector from the global table 82 is employed to select all three tier entries for the method. For example, if the top tier list has 256 entries, each middle tier list has 16 entries, and each bottom tier list has 16 entries, and if the selector is a 2-byte value, then the more significant byte is employed to select the entry in the top tier list, the more significant 4 bits of the less significant byte are employed to select the entry in the middle tier list pointed at by the selected entry in the top tier list, and the less significant 4 bits of the less significant byte are employed to select the entry in the bottom tier list pointed at by the selected entry in the middle tier list, and the method descriptor for the method 62 is stored in such selected bottom tier list entry. Of course, one skilled in the art will now recognize that other variations on the three-tiered sparse array described above may be employed to produce a dispatch table 84 without departing from the spirit and scope of the present invention.

With the three-tiered sparse array described, a dispatch table 84 may make references to up to 65,536 methods, although in almost all cases the dispatch table 84 would refer to far fewer methods 62. Moreover, since the array for the dispatch table 84 is sparse, memory management techniques can be employed to store the dispatch table 84 in a relatively small amount of space.

For example, when constructing the dispatch table 84D for a derived class 54, as seen in FIG. 10, (and the dispatch table 84B for the base class 54 has already been constructed), it is preferable that the CMS 10 of the present embodiment first creates a default dispatch table 84D in which the top tier is newly constructed for the derived class 51 but refers to the middle tiers that belong to the base class 54 (B-2, e.g.). Therefore, the derived class 54 automatically inherits all of the methods 62 from the base class 54.

After setting up the default table, the CMS 10 processes the lists of methods 62 that the derived class 54 implements. For each method 62, the selector from the global table 82 is employed to select the bottom tier list and entry for the method 62. If the bottom tier list for the entry already exists and is not shared with the base class 54 (D-13-2, e.g.), the selector is stored in such bottom tier list. If the bottom tier list for the top tier entry already exists and is shared with the base class 54 (B-9-2, e.g.), then the CMS 10 allocates the memory for a new bottom tier list in the dispatch table 84D for the derived class 54, copies the data from the existing shared bottom tier list to the newly allocated bottom tier list, and then stores the method descriptor in the newly allocated bottom tier list (D-9-2). Moreover, a reference to the newly copied bottom tier list is stored in the relevant entry of the relevant middle tier list for the derived class 54 (D-9). Before the reference can be stored, the relevant middle tier list may have to be copied from the base class 54 if not already present in the dispatch table 84D for the derived class 54.

When a selector that has all three indices encoded is encountered, the process for selecting the method 62 corresponding to the selector using the three-tiered sparse array is as follows:

```
methodDescriptor = &unimplementedMethodDescriptor;
majorIndex = GET_MAJOR_INDEX (selector);
if (majorIndex < pDispatchTable->maxMajorIndex)
    {
    pMiddleTier = pDispatchTable->pMiddleTier + majorIndex;
    middleIndex = GET_MIDDLE_INDEX (selector);
    if (middleIndex < pMiddleTier->maxMiddleIndex)
        {
        pLowTier = pMiddleTier + middleIndex;
        lowIndex = GET_LOW_INDEX (selector);
        if (lowIndex < pLowTier->maxIndex)
            {
            methodDescriptor =
            &pLowTier->methodDescriptor;
            };
        };
    };
```

Embedded Objects

Figure 11:
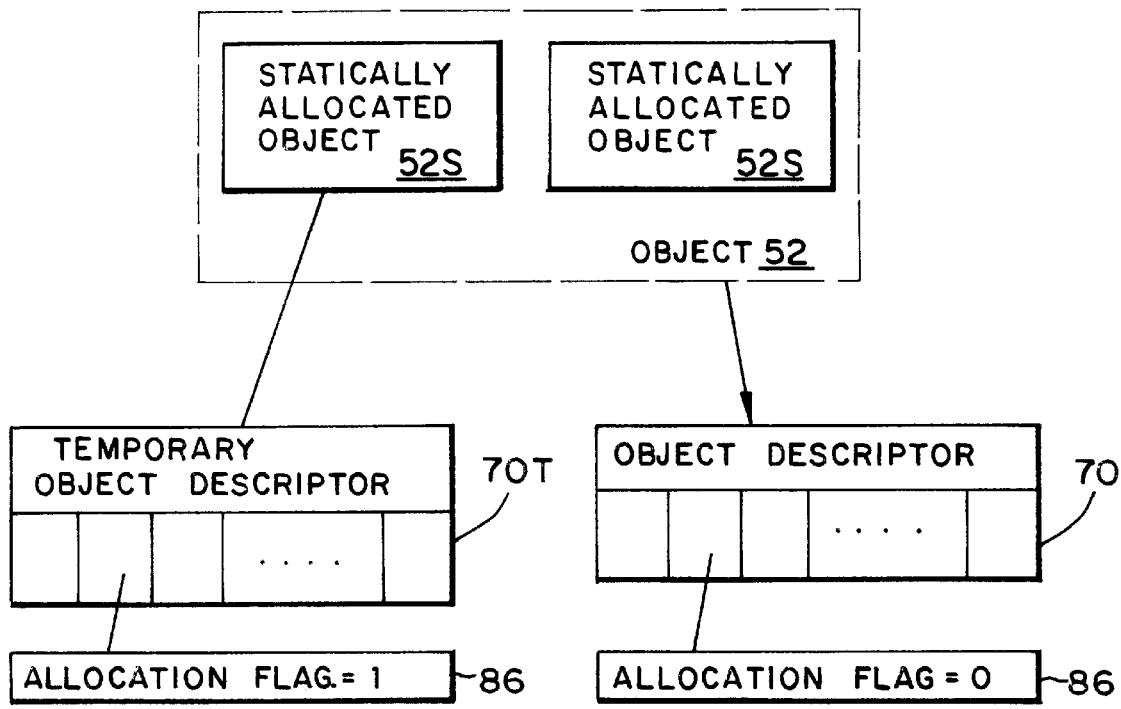
FIG. 11 is a block diagram showing a statically allocated object embedded within another object in the preferred embodiment of the present invention.

Preferably, the programming language 53 of the present embodiment supports the concept of embedded object instance data. As should be understood, and as seen in FIG. 11, the instance data 72 of an object 52 of one class 54 can contain the instance data 72 of an object 52S of an embedded class 54, or a pointer to the instance data 72 of the object 52S of the embedded class 54. The embedded instance data 72 is not actually an object 52 in that the embedded object 52S does not have an object descriptor 70. However, the programming language 53 must support using the instance data 72 of the embedded object 52S to invoke methods 62. Therefore, whenever the embedded object 52S is employed to invoke a method 62, the CMS kernel 12 preferably creates a temporary object descriptor 70T having a reference to the instance data 72, a reference to the object 52 within which the object 52S is embedded, and a temporary object descriptor flag 86.

Embedded instance data 72 associated with an embedded object 52S is considered to be part of the container object 52, and cannot exist separately. Accordingly, the persistent store 18 within which the object 52 is stored does not know of the existence of the embedded instance data 72, and no other object 52 may contain a reference to such embedded instance data 72. As should be understood, while embedded objects 52S may be statically allocated in other objects 52, actual objects 52 can only be statically allocated as local or global variables, and cannot be statically allocated in other objects 52.

The performance benefits of statically allocated embedded instance data 72 in embedded objects 52S should be understood when it is considered that objects 52 composed from multiple dynamically allocated objects 52 are more costly. More specifically, to compose an object 52 from other objects 52, it is typically necessary to dynamically allocate each of the component objects 52 and store their handles 68 in the main object 52. Time is required to allocate the memory for each of the dynamically allocated objects 52, memory overhead is associated with every dynamically allocated object 52, programming effort is required to treat the main object 52 and its components as one object 52, and the persistence manager 30 (discussed below) must track each of the individual objects 52. Further, more time is needed to load and save multiple objects 52 than to load and save the same information as one main object 52 with embedded objects 52S. As seen in FIG. 11, then, it is preferable that the CMS 10 of the present embodiment supports statically allocated objects 52S embedded in other objects 52 ("instance data structures"). Preferably, such embedding is defined in the instance data definition 100 of a class 54.

More preferably, when the compiler 55 of the CMS 10 encounters a declaration of a statically allocated embedded object 52S, memory for the member variables 60 is allocated, but memory for an object descriptor 70 is not allocated. Instead, a temporary object descriptor 70T is dynamically allocated at run-time when the object 52 is used to invoke a method 62. As should now be understood, such an arrangement provides a tremendous savings if a relatively large number of objects 52 are embedded.

Given a statically allocated embedded object 'myObject' and a method 'myMethod', the method 62 can be invoked or called using the syntax 'myObject.myMethod ( )'. Since the first parameter to myMethod will be a handle 68 that points to the object descriptor 70 for myObject, the CMS 10 must generate a temporary object descriptor 70T as part of the call. The temporary object descriptor 70T must be retained until the end of the statement that invokes the method 62. If myMethod returns the handle 68 that was used to invoke it, then the following statement saves a pointer (i.e. a reference) to the temporary object descriptor 70T:

MyClass *pMyObject = myObject.myMethod ( );

However, attempts to use the returned handle 68 are invalid as they may or may not work depending on whether the temporarily allocated memory has been reused.

To one skilled in the art, it might at first seem natural to declare a pointer to an object 52 and to assign the address of a statically allocated embedded object 52S to the pointer. For example, MyClass *pMyObject = &myObject;

However, the CMS 10 of the present embodiment does not permit such a statement since MyClass * is a handle 68 that points to an object descriptor 70 for a MyClass object and &myObject is a pointer to the instance data 72 of a MyClass object. Put simply, MyClass * and &myObject are different data types.

To overcome the aforementioned problem, the programming language 53 of the present embodiment preferably includes a keyword such as 'embedded' that allows a programmer to declare a pointer to the instance data 72 of an object 52. As should be understood, 'embedded' is a type modifier, and must appear before a class name. To allow pMyObject to point to myObject, MyClass must be declared as:

embedded MyClass *pMyObject = &myObject;

As discussed above, an object descriptor 70 is allocated automatically whenever a statically allocated embedded object 52S is used to invoke a method 62. Preferably, it is also possible to generate a handle 68 and object descriptor 70 using an 'ALLOCATE_HANDLE' operator. As should be understood, such operator operates on a statically allocated embedded object 52S and returns a handle 68 that points to the object descriptor 70. Each object descriptor 70 created in such a way must be explicitly freed using a 'FREE_HANDLE' operator.

To facilitate management of object descriptors 70, each object descriptor 70 preferably contains an allocation flag 86 to indicate whether the object 52 is statically (1 in FIG. 11) or dynamically (0 in FIG. 11) allocated, and whether the object 52 is embedded. Preferably, the CMS 10 can call a "free" routine that checks the allocation flag 86 in each object descriptor 70. As should be understood, the free routine acts to free up memory associated with dynamically allocated objects 52, if appropriate, and has no effect on statically allocated embedded objects 52S.

Handling of Types

To allow a programmer to specify as much as possible about data types without creating unintended constraints, it is preferable that the programming language 53 of the present embodiment supports composite types by having an '&&' operator in the context of type declarations. When used, the '&&' operator declares that an object 52 is a member of a certain class 54 and also that the object 52 supports some additional methods 62. For example, given a class 'MyClass' and interfaces 'interface1' and 'interface2', a programmer can specify that an object 52 is a member of MyClass and also supports both of the interfaces 56 by using the syntax:

MyClass && interface1 && interface2 *oObject;

In effect, an unnamed data type has been declared, and at some point in the future an operation will take advantage of the data type to operate on an object 52 that is instantiated from class 'MyClass' and that supports the methods 62 in the data type. In such a declaration, the first type may be either a class 54 or an interface 56. If the first declaration is not a class, then class Object is assumed by the compiler. The types following the first '&&' operator must all be interfaces 56. These may be interfaces 56 that were explicitly declared, or interfaces 56 that were created by combining interfaces 56 with a 'typedef' operator. For example, given interfaces 'interface1', 'interface2', and 'interfaces', the following statements create composite types 'combinedInterfaces' and 'moreCombinedInterfaces', respectively:

typedef interface1 && interface2 combinedInterfaces;
typedef interfaces && combinedInterfaces moreCombinedInterfaces;

Preferably, the programming language 53 of the present embodiment implements the concept of narrowing of types. Type A is considered narrower than type B if the set of objects 52 that are type A is a subset of the set of objects 52 that are type B. Such relationship is determined partially by the class component and partially by the interface component. Type A is narrower than type B if the class component is narrower and the interface component is narrower.

The class component of type A is narrower than the class component of type B if type A is either directly or indirectly derived from type B. Ignoring interfaces 56, if type A is derived from type B then everything that is of type A must also be type B. Accordingly, if type A is narrower than type B, any operation that will work on type B will also work on type A (i.e. will accept any type broader than type A). The interface component of type A is narrower than the interface component of type B if every interface 56 supported by type A is also supported by type B.

Preferably, the programming language 53 of the present embodiment also implements the concept of assignment compatibility. As should be understood, assignment compatibility determines whether a value is allowed as an argument to a function or method 62. Type A is assignment compatible with type B if a value of type A can be assigned to a value of type B. An operation expecting an input of type B can accept an input of type A if type A is assignment compatible with type B.

If the declarations of types A and B specify some combination of interfaces 56 and classes 54, then a value of type A can be assigned to a value of type B only if type A is narrower than type B. That is, a value of type A can be assigned to type B only if the set of objects 52 satisfying type A is a subset of the objects 52 satisfying type B; and a value of type A can be assigned to type B only if type A supports every interface 56 required by type B, and the type B class is a base class of the type A class.

As should be understood, the concepts of narrowing and assignment compatibility add flexibility to the programming language 53 of the present embodiment. More importantly, such concepts increase the ability of the CMS 10 to perform type checking and other forms of error checking at compile-time rather than at run-time.

When a programmer creates a method 62 of a derived class 54 that overrides a method 62 of a base class 54, there is often a need to change the declarations in the method 62 of the derived class 54 to narrow the return type (i.e. the type of a value provided by the method) so that a reference to a base class 54 becomes a reference to a derived class 54, or to make a similar change to a parameter type (i.e. the type of a value provided to the method). This type of change is allowed for return types but not for parameter types.

To understand why, consider what happens when a method 62 of the derived class 54 is called in a context where the compiler 55 only knows that the object 52 is a member of the base class 54. Such a situation occurs frequently in object-oriented languages, because a variable declared as a reference to a base class 54 can contain a reference to an object 52 that is a member of one of the derived classes 54. When the compiler 55 performs the type checking on the method invocation, such compiler 55 can only use the method declaration from the base class 54 even though at run-time the method 62 in the derived class 54 will be invoked.

As one skilled in the art should recognize, then, an illegal narrowing of the type occurs if an argument is a reference to the base type satisfying the requirements of the declaration in the base type, but the method 62 from the derived class 54 that is being invoked expects a reference to the derived class 54, then that is an illegal narrowing of the type. No compiler 55 can detect the illegal narrowing in this method invocation, because the compiler 55 can only use the method declaration from the base class 54. In fact, the method 62 that is invoked may be coded after the invocation is compiled.

The only way to avoid such an illegal narrowing is to prohibit changing the method declaration in the derived class 54. The problem is alleviated somewhat by employing the convention that the first parameter to a method 62 is always a pointer to the object 52 used to invoke the method 62. Accordingly, the type of the first parameter is known to be a pointer to an object 52 that is a member of the class 54 where the method 62 was implemented, or a derived class 54 of that class 54. Such implicit narrowing of one parameter is preferably built into the CMS 10 of the present embodiment.

To understand why narrowing a return type is allowed, consider that when a method 62 of the derived class 54 is called in a context where the compiler 55 only knows that the object 52 is a member of the base class 54, the method 62 returns a reference to an object 52 of the derived class 54. Where the method 62 is invoked, the compiler 55 expects a pointer to the base class 54. Such implicit broadening of type is acceptable.

As one skilled in the art would recognize, "casting" is a programming concept whereby an object 52 of type A is treated as if it were of type B so that the object 52 can be operated on by an operation expecting type B. However, casting by its nature is intended to "fool" the compiler 55 during type checking at compile-time, and run-time errors can result if the programmer is inattentive. Since anything can be changed by a cast, it is far too easy for a programmer to make a mistake that the compiler 55 cannot detect.

Nevertheless, some casts are necessary, so it is preferable that the programming language 53 of the present embodiment supports a technique for casting that solves these problems. More preferably, the programming language 53 of the present embodiment supports the casting operators that have been introduced in the C++ programming language, version 3.0: dynamic_cast, reinterpret_cast, const_cast, and static_cast.

The concept of dynamic casting during run-time was discussed above in terms of determining whether an object 52 is of a certain class 54. The syntax for a dynamic cast is:
dynamic_cast <NewClass *> (expression)
where 'NewClass' must be either a class or interface name, possibly followed by an interface list.

As should now be understood, dynamic casting can be employed to navigate the class hierarchy and to safely test whether an object 52 supports an interface 56, and can be employed both to narrow and broaden types. Preferably, the type conversion that results from a dynamic cast is verified at compile-time, to the extent possible, and the compiler 55 generates code to verify the rest of the type conversion at run-time. If the run-time tests all pass, then the dynamic cast provides a reference to the casted object type. Otherwise, the dynamic cast returns a 0.

If, in a dynamic cast, an object 52 of a derived class 54 is converted to an object 52 of a base class 54 ("up-cast") (i.e. a broadening of type), then the compiler 55 can determine that the conversion is valid and no run-time code is generated. However, if an object 52 of a base class 54 is converted to an object 52 of a derived class 54 ("down-cast") (i.e. a narrowing of type), then the conversion must be checked at run-time and the compiler 55 generates the proper code for such run-time checking. Up-casts do not require any run-time checks since every object 52 is implicitly a member of each base class 54 from which the class 54 of the object derived. Up-casts are valid without a dynamic cast. Down-casts always require dynamic casts and a run-time check. Up-casting and down-casting to interfaces 56 is handled in a similar manner.

Preferably, a dynamic cast may include types that were created from both interfaces 56 and classes 54. For example, the expression type may be 'BaseClass && Interface11 *' and the target type may be 'DerivedClass && Interface1 && Interface2 *'. In such an expression, the compiler 55 may generate multiple run-time cast operators, one for each piece of information that such compiler 55 cannot verify at compile-time.

A dynamic cast cannot remove any type qualifiers. For example, if the type of the expression is 'const BaseClass', the target type must also be a 'const' type. The const type qualifier is discussed below.

Templates

The concept of a template 58 as a language feature was described above. As was discussed, templates 58 provide a mechanism for implementing container classes. A container class is a class 54 that holds references to objects 52 of other classes 54. The container class provides for storage and some kind of ordered, fast access to the objects 52 contained within such container class.

In the programming language 53 of the present embodiment, templates 58 are created by defining a parameterized class ("shell class") and preceding the shell class with the keyword 'template' followed by a list of types that are to be parameterized. To use the parameterized type in a class declaration 64, the class name is specified as in a normal declaration and is followed by a list of type arguments. The compiler 55 of the present embodiment substitutes the arguments for the parameters and creates the executable code for the template 58 itself using the template constraint type.

As seen in FIG. 5, templates 58 are preferably compiled prior to instantiation. Therefore, the compiler 55 must know what attributes of the argument type the template implementation uses. Also, when the template 58 is instantiated the compiler 55 needs some mechanism to determine if all of the requirements have been met. Therefore, type argument constraints must be expressed in a template declaration to let the compiler 55 check for consistency of the instantiation. Because the different instantiations of a template 58 do not get different implementations, nothing in the template 58 can depend on the size of the type parameter, and there are restrictions on assignment compatibility of parameters.

More specifically, the layout of the shell class cannot depend on the size of the type parameter. Therefore, the shell class itself cannot contain any occurrences of the type parameter. As should be understood, if such a situation were allowed, the layout of the structure would be different depending on the type. Also, nothing in the implementation of a template 58 can depend on the size of a type argument. Therefore, using a 'sizeof' operator on the type parameter is not permitted. Also, performing pointer arithmetic on a pointer to a type parameter is not permitted, and is in fact meaningless in the present context.

Within the implementation of the template 58, for the purposes of determining assignment compatibility, a template constraint is considered to be broader than but not equal to the parameter type. Consider the following two template declarations:

```
template <class Param : Line>//    'first template'
class BaseClass : Object
{
Param     *oParam;
Param     *save (Line *oInput);
};
template <class Param : Line> //    'second template'
Param *BaseClass::save (Line *oLine)
{
oParam = oLine;    // INVALID
return pParam;
};
```

The assignment statement is invalid in the second template declaration even though 'Param' type is constrained to be at least a 'Line'. If a program instantiates this class providing a type argument of a class that is derived from 'Line' then such statement is incorrect. Therefore, the compiler 55 must generate an error because there is a chance that the statement may become incorrect depending on what type argument is provided during instantiation of a class 54 from the template 58. Conversely, 'oLine = oParam' is allowed since every oParam must point to some Line.

Template types can appear as type arguments to other templates 58 (i.e. can be nested). Given a template 'Array', then, the following statement is valid:

Array <Array <People> > employees;

A type parameter can also be used for a template argument. For example:

```
template <class savedType: String>class StringAvlTree:
    AvlTree <savedType> { . . . . [member declarations] . . . };
```

In the above example, the template parameter is used as an argument to 'AvlTree'. When 'StringAvlTree' is instantiated, the type argument for 'savedType' is used every place StringAvlTree uses savedType, plus every place AvlTree uses its parameter type.

Outside of the template 58, the parameterized type takes on the type of the parameter argument. For example, if a template 58 has a declaration:
ParameterType *getobject ( );
and the template class is instantiated with the template argument 'Name', then 'ParameterType' is treated as type Name for that instantiation. For example:

```
ContainerType <Name> *oNameContainer;
Name *oName;
oName = oNameContainer->getObject ();
``` is a valid statement. When 'oNameContainer' is used to invoke 'getObject', the type argument 'Name' is substituted for the type parameter, making getObject's return type 'Name*'.

Two instantiations of template types generate the same class 54 if and only if the type arguments are the same. Consider the following declaration:

```
template <class savedType: Comparison>
    class AvlTree : Object { . . . . [member declarations] . . .};
    AvlTree <Name> *oFirst;
    AvlTree <Integer>   *oSecond;
    AvlTree <Name> *oThird;
```

In this example, both 'oFirst' and 'oThird' point to instantiations of the same class 54, but 'oSecond' does not. 'AvlTree <Integer>' and 'AvlTree <Name>' are different classes 54.

Now consider how this concept extends to inheritance. Assuming the interface 'String' supports the interface 'Comparison', declare the new class template as:

```
template <class savedType: String> class StringAvlTree:
    AvlTree <savedType> { . . . . member declarations . . . };
```

Given the declarations:

```
AvlTree <Name> *oFirst;
StringAvlTree <Name> *oFourth;
```

'oFourth' is considered narrower than 'oFirst' because 'AvlTree <Name>' is a base class 54 of 'StringAvlTree <Name>'. Therefore, it is possible to use a 'StringAvlTree <Name> *' wherever a 'AvlTree <Name> *' is required. Dynamic casting oFourth to AvlTree <Name> * is allowed and does not generate any run-time type checking code.

For the sake of assignment compatibility, an instantiated template 58 (i.e. a class 54) is treated like any other class 54. Two instantiated templates 58 are treated as the same type if and only if their type arguments are identical.

An instantiated template 58 can be used as the target type in a dynamic cast by specifying the instantiated name as the target type. Using the declarations from the previous example, the following run-time dynamic cast can be used:
dynamic_cast <StringAvlTree <Name> *>(oFirst)
since the compiler 55 generates separate class objects 52C for both AvlTree <Name> and StringAvlTree <Name>.

Const Type Qualifier and Persistence

C-derived languages support the concept of a "const" type qualifier, whereby data cannot be changed when modified with a const. Given a declaration:
const Door *oDoor;
'oDoor' cannot be used to modify the contents of the object 'Door'.

A class method 62 can be explicitly declared const by adding const after the method arguments. For example,
int getSize ( ) const;
Every method 62 has an implicit parameter that is a pointer to the object 52 used to invoke the method 62. If a method 62 is non-const, the implicit declaration is:
ClassName *this;
If the method 62 is const, then the implicit declaration is:
const ClassName *this;
A const method 62 can be invoked using either a const or non-const object 52. A non-const object 52 can only invoke a non-const method 62.

Because managing const is difficult for programmers, it is preferable that the programming language 53 of the present embodiment supports the 'const_cast' operator. As should be understood, const_cast provides the ability to "cast away" const from an object 52, but does not allow for changing the type in any other way. The syntax of a const_cast is:
const_cast <new type> (expression);
The new type must be identical to the type of the expression, with the exception that some of the const qualifiers may be removed. Const_cast must be restricted to objects 52, for reasons discussed below.

If a const object 52 is used to retrieve a reference to other data, it is preferable that the programming language 53 of the present embodiment propagates the const property to the other data. More preferably, the programming language 53 considers such other data to be part of the referring object 52 (i.e. propagates the const property). As is discussed below, such an interpretation is necessary for object management, including management of transactions and model persistence. If a const method 62 could modify anything the const object 52 refers to, then programs could easily modify data and bypass the persistence manager 30 of the CMS 10 (discussed below). That is, it would be possible to make changes in memory that would not be saved to a persistent store 18.

Figure 12:
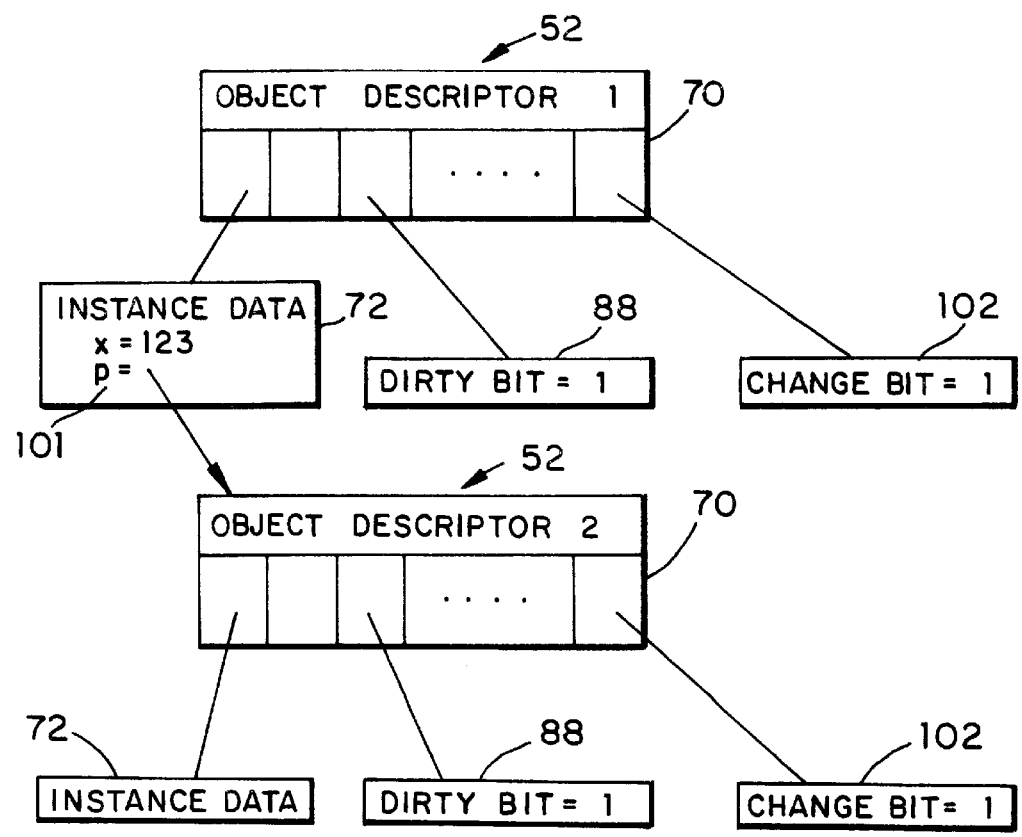
FIG. 12 is a block diagram showing 'dirty' and 'change' bits in object descriptors of dependent objects in the preferred embodiment of the present invention.

Preferably, whenever the compiler 55 detects that some source code will cause an object 52 to be changed, the compiler 55 generates code to notify the CMS object/persistence manager 30. During run-time, the notified object manager 30 then sets a "dirty bit" 88 (as seen in FIG. 12) in the object descriptor for the object 52 (i.e. marks the object dirty) to record that the object 52 is changed in the current session, and also sets a "change bit" 102 (also seen in FIG. 12) in the object descriptor for the object 52 (i.e. the object is marked changed) to record that the object 52 was changed in the current transaction. Also preferably, whenever the compiler 55 detects source code that prevents such compiler 55 from detecting whether an object 52 is to be changed, the dirty bit 88 and the change bit 102 are also set. In such a manner, the persistence manager 30 is informed that the object 52 must be newly saved to the appropriate persistent store 18, and the transaction manager 46 is notified that the object 52 must be included in the end-of-transaction processing (to be discussed below).

An object is preferably also marked dirty if a value of a member variable 60 is retrieved and that member variable 60 contains a pointer that is not a pointer to another object 52. As mentioned above, non-object memory that an object 52 points to is treated as if part of the object 52.

Preferably, the object/persistence manager 30 of the kernel 12 is notified when an object 52 has been changed. The object manager 30 then determines whether the changed object 52 is actually a statically allocated embedded object 52S embedded within an embedding object 52. If so, the embedding object 52 is located by way of an embedding object reference (not shown) in the temporary object descriptor 70T for the statically allocated embedded object 52S, and the embedding object 52 is marked dirty.

The logic for deciding when the compiler 55 should produce change-notification instructions relies on components that: track whether a parsed expression refers to instance data 72 accessed through the instance data reference 74 of an object descriptor 70; decide whether the right hand side (RHS) of an assignment or an equivalent triggers any right-hand rules for emitting a change-notification instruction; and decide whether the left hand side (LHS) of an assignment triggers any left-hand rules for emitting a change notification. As may be understood, for purposes of this description, an expression is considered a RHS if such expression actually is the RHS of an assignment, is used to compute the value in a return statement, or is used as a function argument.

Figure 25:
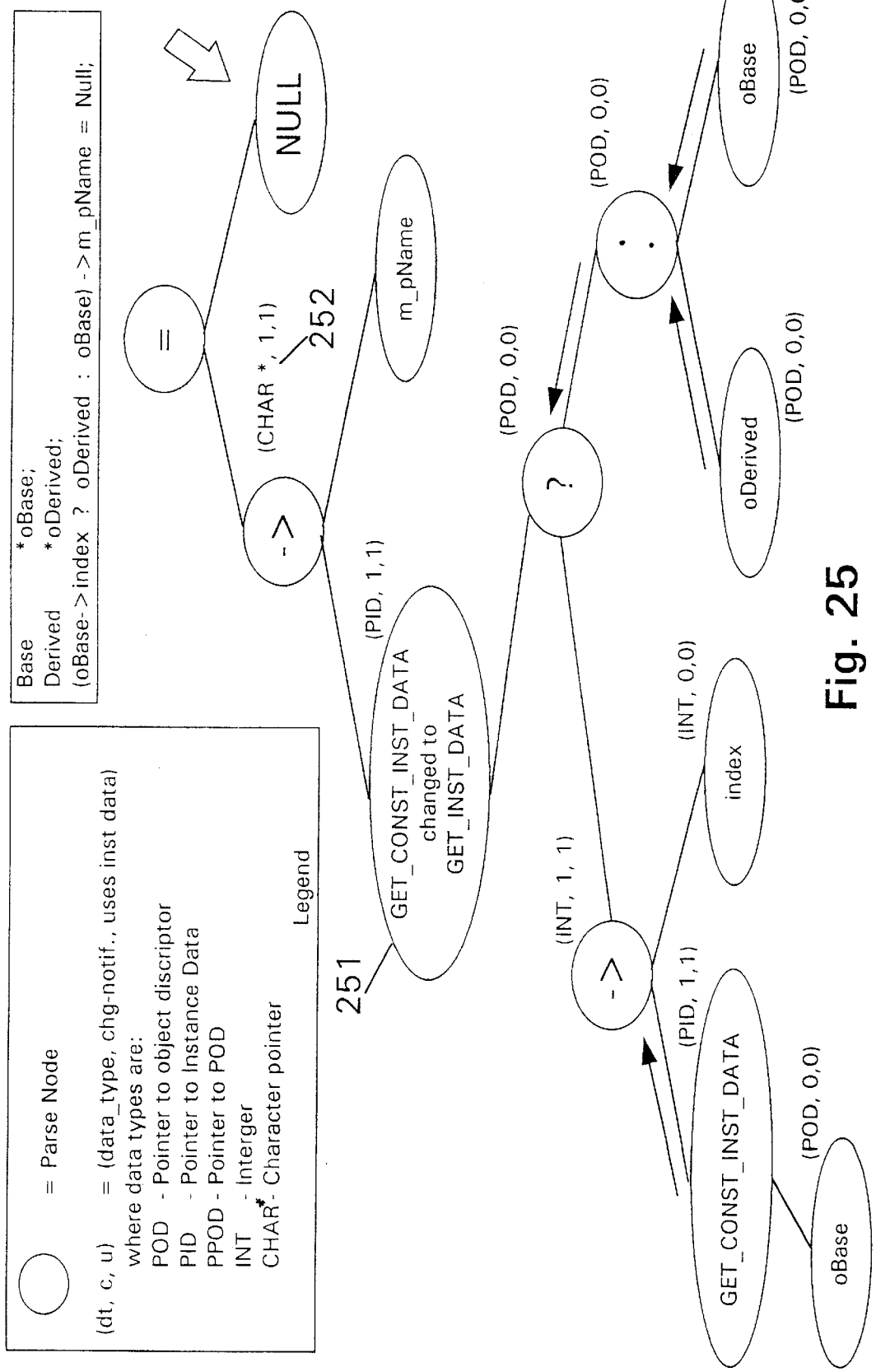
FIGS. 25 and 26 are block diagrams showing parse trees developed by the compiler in the preferred embodiment of the present invention.
Figure 26:
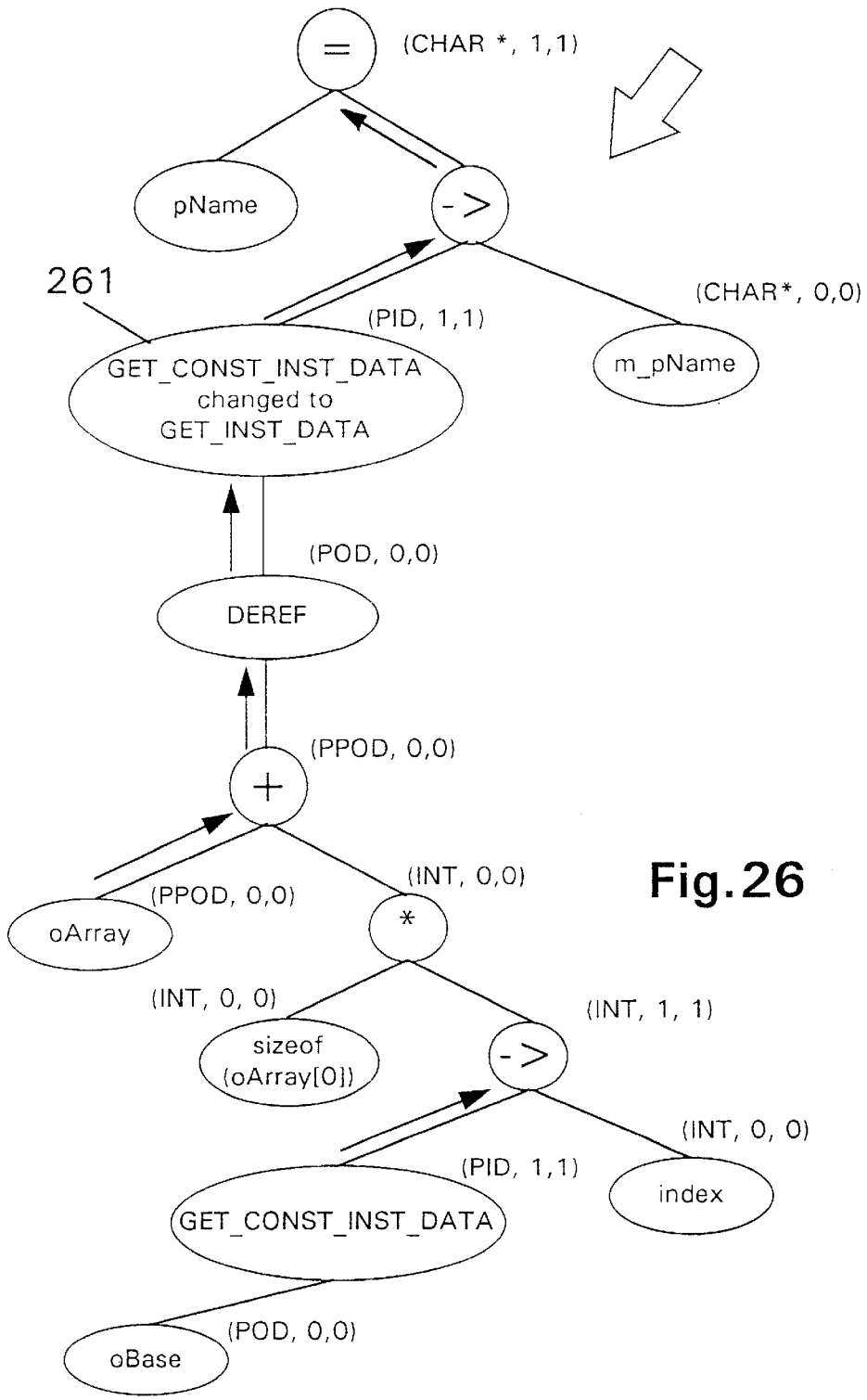

More specifically, the compiler 55 includes a parser (not shown) which must create a node in a parse tree for every component of the grammar recognized in parsing an expression. As seen in FIGS. 25 and 26, when the parser applies a '.' or '−>' operator to a node that refers to an object descriptor 70, and the RHS of the operator is a data member, then the parser must create a first node which is either a GET_INSTANCE_DATA node or a GET_CONST_INSTANCE_DATA node. The GET_INSTANCE_DATA node tells the compiler's code generator that the instructions emitted for this node must retrieve the instance data reference 74 and also must invoke the run-time change notification logic. The GET_CONST_INSTANCE_DATA node tells the code generator that the instructions emitted for this node must retrieve the instance data reference 74 but should not invoke the run-time change notification logic.

At the time the parser creates the first node (node 251 in FIG. 25, node 261 in FIG. 26), it does not have sufficient information to decide which type of node to generate. It cannot know how the data will be used until the expression has been completely parsed, so it must use one of the node types as a default and fix up the first node as necessary when the expression has been completely parsed. Preferably, the compiler 55 generates a GET_CONST_INSTANCE_DATA node under the assumption that data members will be read more frequently than written and therefore defaulting to GET_CONST_INSTANCE_DATA will minimize the number of times it is necessary to fix up the first node.

When the compiler creates a first node which is either a GET_INSTANCE_DATA node or a GET_CONST_INSTANCE_DATA node, it also sets 2 flags in such first node. The first flag signifies that the current parse tree retrieves an instance data pointer. The second flag signifies that change notification may be required. As the parser continues parsing the expression, it propagates the values of these flags to the parent nodes. When an expression is used as the RHS or LHS of an assignment, the compiler 55 uses the first and second flags as an aid in deciding if the parse tree contains a GET_CONST_INSTANCE_DATA node that must be changed to a GET_INSTANCE_DATA node.

To understand how the first and second flags are propagated, it is necessary to consider each type of parse tree node that the compiler can generate. As one skilled in the art will recognize, these node types correspond to the standard rules of grammar for a C-derived language. Examples of such parse trees are shown in FIGS. 25 and 26. Using the node types of the compiler 55 of the present embodiment is a means to illustrate the technique, but the technique can easily be applied to other grammars and implementations.

No changes can occur and therefore no change propagation is required if an operator cannot produce an lvalue and also cannot produce a result that is a pointer type. Therefore, the first and second flags are set to zero for all operations that only produce non-pointer rvalues. One skilled in the art will recognize that the unary operators 'sizeof', '−', and '!', and the binary operators '*', '/', '%', '−', '>>', '<<', '<', '>', '<=', '>=', '==', '|', '&&', '||', '*=', '/=', '−=', '<<=', '>>=', '&=', '^=' and '|=' all produce rvalues that cannot be pointer types. Therefore, for nodes corresponding to these operators, the flags are always set to zero.

Since identifiers, constants, and strings do not have subtrees and therefore have nothing to propagate, the flags are always zero for associated nodes. For an expression enclosed in parentheses, the compiler creates a parse tree by compiling the expression enclosed in the parentheses, but does not add a new node for the parentheses. Therefore, there is nothing to propagate or to change. Propagation must be considered carefully for other operators including array indexing, function calls, '.' and '−>' member reference, '++' and '−−'; the unary operators '++', '−−', casting, '&', '*', '+', and '−'; the additive operators '+' and '−'; the assignment operators '=', '−=', and '+='; and the comma operator.

For array indexing, the compiler 55 first creates a PLUS node where the left subtree determines how the base address is computed and the right side determines how the index is computed. The compiler 55 then generates a DEREFERENCE operator to use the data at the address determined by the left subtree of the DEREFERENCE node. The logic for propagation when creating a PLUS node is included in the discussion of the '+' operator, below. The logic for propagation when creating the DEREFERENCE node is included in the discussion of the unary '*' operator, below.

The flags are always set to zero for the function call operator. If change notification is required for the value returned from a function, then that change notification must occur in the function itself, not in the expression that: calls the function.

When a '.' or '−>' member reference operator is used to invoke a method, the flags are always set to zero. This is just a function call. If the '.' or '−>' operator is used to access a member variable, then the behavior depends on both the left and right sides of the '.' or '−>' operator. The left side is processed first, so processing the left side sets the flag values but processing the right side may clear those values. If the left side is a pointer to an object 52, then the compiler 55 creates a GET_CONST_INSTANCE_DATA node and sets both flags to 1. If the left side is a pointer to something other than an object 52, then the compiler 55 propagates the flags from the left side. Then, if the member specifier on the right side of the operator specifies a volatile member (discussed below), the compiler 55 clears the change notification flag of the new node.

The prefix and postfix operators '++' and '−−' all propagate the flags. For a casting operator, the result cannot be an lvalue. Therefore, the result is propagated only if the new type is a pointer to a non-object. The pointer to a non-object is propagated because the data it points to is considered to be embedded in the object 52 that contains the data. However, if the pointer is to an object descriptor 70, then the object 52 may or may not be embedded. In either case, that can be determined at run-time by examining the object descriptor 70. Both flags are propagated for both the unary '*' and '&' operators.

Most binary arithmetic operators cannot be used to generate lvalues or expressions of type pointer. Therefore, for most of these the flags are set to zero. The exceptions are '+' and '−'. The '+' operand can be used to add a pointer expression with a non-pointer expression. In this case, the flags are propagated from the subtree that is of type pointer. Otherwise, the values for a new '+' node are always set to zero. Likewise, the '−' operator can subtract a non-pointer from a pointer. In this case, the flags are propagated from the subtree that is of type pointer. Otherwise, the values for EL new '−' node are always set to zero.

For the assignment operator '=' and the modify operators, the data type and location of the data can be determined by inspecting the left subtree. Therefore, the flags are propagated from the left side. For the comma operator, the value is determined by the right subtree. For example, in the expression 'var1 =func ( ), var2', the return value from 'func ( )' is not used. The generated code will call func, and then will assign the value of var2 to var1. Since only the right-most value is used, the flags are propagated from the right-most expression.

For the '?' operator, the value may be supplied by either the left side or the right side of the required subsequent colon operator. Therefore, the propagated flag values are computed by ORing together the corresponding values of the left and right subtrees of the colon operator.

The compiler 55 uses the node flags in its logic for processing the LHS of an expression, the RHS of an expression, the expression in a return statement, or an expression used to compute an argument in a function call or method invocation. A parse tree contains a GET_CONST_INSTANCE_DATA node that is a candidate to be changed to a GET_INSTANCE_DATA if and only if the root node change-notification flag is set. In this case, the compiler 55 uses either an lvalue algorithm or rvalue algorithm to determine if the node must be changed. The lvalue algorithm is used if the tree is the left side of an assignment statement (as is the case in FIG. 25). The rvalue algorithm is used if the tree is the right side of an assignment statement (as is the case in FIG. 26), computes the value of a function argument, or computes a return value.

If the change-notification flag is set (flag 252 in FIG. 25), the lvalue logic always changes the GET_CONST_INSTANCE_DATA node. The lvalue algorithm used is:

1. if the node's change-notification flag is not set, return. Processing of the current subtree is complete.
2. if the node is a unary GET_ADDRESS_OF, ACCESS_MEMBER_OF, DEREFERENCE, CAST, PLUS, or MINUS, apply the algorithm to the child subtree.
3. if the node is a GET_INSTANCE_DATA or GET_CONST_INSTANCE_DATA, change the node to GET_INSTANCE_DATA and return. Processing of the current subtree is complete.
4. if the node is binary COLON, PLUS, MINUS or CAST apply the algorithm to either side that has the change-notification flag set.
5. if the node is QUESTION, apply the algorithm to the right subtree. The root of such subtree is the COLON node.
6. if the node is a COMMA, apply the algorithm to the right subtree.
7. otherwise, return.

The processing of the current subtree is then complete.

The rvalue logic is essentially the same, except that the GET_CONST_INSTANCE_DATA node is changed only if the expression provides a pointer to data making it possible to change the data without the change notification occurring. Therefore, the rvalue logic only changes the node if the data type of the expression is "pointer-to-nonconst". Furthermore, the node is not changed if the expression is "pointer-to-object-descriptor", since the object descriptor 70 can be used to perform the change notification wherever the result of such expression is used to change the object 52.

In the parse tree shown in FIG. 25, the parser preliminarily sets node 251 to GET_CONST_INSTANCE_DATA, and such node 251 is subsequently changed to GET_INSTANCE_DATA since the change notification flag 252 and the use-instance-data flag are set. Note that if 'index' was a volatile member (discussed below), the change notification flag 252 would be reset to zero. In the parse tree shown in FIG. 26, the parser detects at assignment that the RHS has the change notification flag and the use-instance-data flag set, and also detects that the data type is a pointer. Since the pointed-to data is treated as if part of the object 52, and since the location the pointer is assigned to is a pointer to non-const data, the parser must generate instructions to invoke the change notification. Accordingly, node 252 is changed from GET_CONST_INSTANCE_DATA to GET_INSTANCE_DATA.

Although the present discussion examines the process the compiler 55 uses when processing just one statement, one skilled in the art will recognize that standard optimization techniques can be applied to reduce the number of change notifications that are generated without departing from the spirit and scope of the present invention. For example, multiple change-notification statements may be combined into one. If a change-notification instruction is emitted because a pointer to object data is assigned to a pointer but analysis of the rest of the code block determines that such pointer is not used to change such data, then the change-notification instruction can be eliminated.

In the CMS 10 of the present embodiment, methods 62 may be implemented in programming languages other than the programming language 53 of the present embodiment. For example, native code functions (platform-provided functions) may be invoked as methods 62. The programming language 53 of the present embodiment can not detect if an object 52 is changed by the native code function. Accordingly, whenever an object 52 is used to invoke a non-const native code function, the CMS run-time code notifies the object manager 30 that the object 52 has changed under the assumption that the object 52 will be changed by such native code function.

Without the restriction that const_cast only works for objects 52, as discussed above, it would be possible to take a const pointer to a component of an object 52 and then to cast away such const using that pointer. As should now be evident, methods 62 could change objects 52 in such a situation without the object manager 30 being notified.

Objects 52 may have member variables 60 that are computed at run-time and are never saved as part of the persistent state. Often such member variables 60 are auxiliary information that may be used in optimizing a search or display, but do not represent part of the state of an object 52. Preferably, the CMS 10 of the present embodiment can modify such "volatile" fields without the object 52 being marked dirty. To support such modification, it is preferable that the programming language 53 of the present embodiment supports the use of a 'volatile' keyword to indicate that a member variable 60 is exempt from const restrictions. Preferably, a volatile member variable 60 can be modified even if the object 52 is const, and a const method 62 can modify volatile member variables 60, but no others.

Run-Time Virtual Machine

As should be understood, the programming language 53 of the present embodiment is employed to write source code. Preferably, the source code is compiled into run-time code that may be executed on any platform 19 having an appropriately configured run-time virtual machine 24 with an interpreter or translator (not shown). As is known, a virtual machine interpreter interprets each run-time instruction each time the instruction is executed, while a virtual machine translator translates a group of run-time instructions into native machine code instructions. Accordingly, translated instructions need not be reinterpreted each time the instructions are to be executed. Instead, translated instructions are retained for re-execution by simply branching to such translated instructions. The following description of the virtual machine 24 applies regardless of whether the virtual machine 24 has an interpreter or translator.

Many prior art virtual machines employ some variation of a stack-based architecture, where machine instructions "push" operands onto the top of the stack, operate on operands that are on the top of the stack, store results on the top of the stack, and "pop" operands off of the top of the stack. With such a stack-based architecture code size is small since many instructions implicitly operate on the top of the stack and therefore need not explicitly specify an operand.

However, and as should be evident to one skilled in the art, the stack-based architecture is inefficient in that operands are pushed and popped excessively to compensate for the fact that there is no way to directly address the operands. Such excessive movement is particularly inefficient in a virtual machine.

To achieve efficiency in a virtual machine, the instructions executed by the machine must be powerful enough that very few are required to perform a task, but simple enough that run-time interpretation or translation overhead is minimized. A register-based architecture allows for a reduction in the number of instructions required to implement a function, but is problematic in that the registers must be saved every time a function is called, and restored when the function returns. Moreover, since the number of registers in such architecture is limited, costly time is often expended shuffling intermediate results of a calculation between registers and temporary locations.

Figure 13:
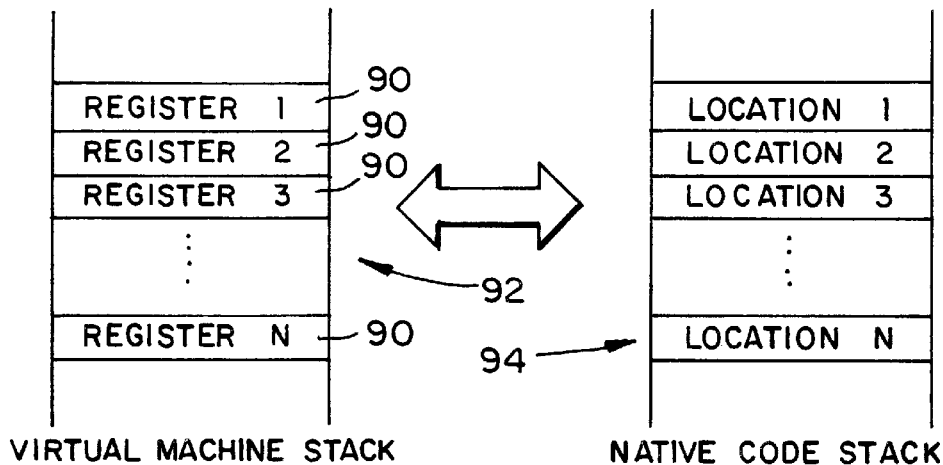
FIG. 13 is a block diagram showing a virtual machine stack and a native code stack in the preferred embodiment of the present invention.

Preferably, and as seen in FIG. 13, the virtual machine 24 of the present embodiment solves the aforementioned problems by employing a hybrid architecture that implements registers 90 as locations in a virtual machine stack 92, where the stack locations are pre-allocated at compile-time. Accordingly, rather than performing a simple add operation by pushing first and second operands on the top of the virtual machine stack 92, adding the two operands from the top of the stack 92, and leaving the result at the top of the stack 92, the virtual machine 24 of the present embodiment moves the first and second operands to specified locations in the virtual machine stack 92 and then adds the operands and stores the result in a specified stack location.

Such an architecture is particularly advantageous when a function is called because the registers 90 are saved automatically merely by advancing the top-of-stack pointer. Therefore, there are no performance considerations for saving the registers 90. Also, shuffling is not necessary because the number of registers 90 is plentiful, and the results of previous operations may be re-used without moving the data.

More significantly, the hybrid architecture allows the programming language 53 of the present embodiment to employ register variables, and the compiler 55 is able to allocate automatic variables and function arguments as register variables. Since the virtual machine 24 operates directly on registers 90, the machine can operate directly on automatic variables and function arguments, eliminating the need to copy the contents of a register variable to a work location.

As was discussed above, the CMS 10 of the present embodiment can call native code functions that are in dynamic link libraries ("DLLs") and functions that are in standard system libraries. Preferably, the virtual machine 24 invokes native code functions by employing an assembly language function that copies the function arguments from the virtual machine stack 92 to a native code stack 94, as seen in FIG. 13, and then dispatches the function.

Preferably, every programming language function call instruction executed at run-time includes a description of the arguments that were pushed into the virtual machine stack 92 for the function call. When a programming language function calls another programming language function, such description is not used. Nevertheless, every function call gets the description in case it is not known at compile-time whether the function is a native code function or a programming language function.

The run-time call description is generated by the virtual machine 24 from a compiler-generated encoding string that describes the call arguments by distinguishing among pointer-to-data, pointer-to-void, and pointer-to-function arguments. Such encoding conveys enough information that the run-time virtual machine 24 can determine on any platform 19 how to move the arguments from the virtual machine stack 92 to the native code stack 94.

When a CMS program is loaded, it is preferable that the CMS kernel 12 convert the call encoding strings in the program to a format that can be used more efficiently by the assembly function that copies the arguments. Although the format is the same for all platforms 19 currently presently in use, future platforms 19 may necessitate format changes.

Preferably, the CMS kernel 12 of the present embodiment maintains a hash table of all call encoding strings in use in the system. Accordingly, after a few CMS programs have been loaded, the CMS kernel 12 rarely has to generate the run-time call description but instead can use the hash table to find an appropriate already-generated call description.

Preferably, the format of the run-time call description is:

```
typedef struct paramDescr
{
ULong           packtype;
struct
    {
unsigned   nWords     : 8;
unsigned   copyOkay   : 1;
    } flags;
}ParamDescr;
```

The packtype field contains a compact description of the calling sequence. Each argument is represented by a 2 bit field in packtype. '00' as a packtype field means there are no more arguments. '10' means that the argument is a 4 bit quantity. '11' means that the argument is a double precision floating point value. The two most significant bits describe the return type of the function using the same encoding.

The nwords field tells how much the native code stack 94 has to be advanced to accommodate the arguments. The copyOkay flag indicates whether the arguments can just be copied as a group directly from the virtual machine stack 92 to the native code stack 94. Preferably, the virtual machine 24 always pushes arguments onto the native code stack 94 the same way. More preferably, all 4-byte types are 4-byte aligned (start on the beginning of a 4-byte memory block) and all 8-byte types are 8-byte aligned. As should be understood, such an arrangement is employed by native code for some but not all platforms 19. When the virtual machine 24 generates a run-time call description, it is preferable that the arrangement for the arguments on the virtual machine stack 92 be the same for both virtual machine code and native code. If so, then copyOkay is set to 1 and nwords is set to a count of 4-byte words to copy. Otherwise, copyOkay is set to 0.

When calling a virtual machine function from native code, the function arguments must be copied from the native code stack 94 to the virtual machine stack 92. To decide how to do that, the native code employs a parameter descriptor associated with the virtual machine function. More particularly, it is preferable that each virtual machine function have a function header that contains a reference to a parameter descriptor for the function, where the parameter descriptor contains the information necessary to set up the virtual machine stack 92 for the called function.

Preferably, the virtual machine 24 of the present embodiment can decide at run-time whether a particular function is a virtual machine function or a native code function. Accordingly, and as should be understood, a program need not be concerned with whether such program is calling into native code or virtual machine code. Preferably, the first 4 bytes of every virtual machine function are '00 00 00 00 H', and the virtual machine 24 determines whether a called function is a virtual machine function based on such information. Of course, one skilled in the art will recognize that other differentiating conventions may be employed without departing from the spirit and scope of the present embodiment.

Preferably, the virtual machine 24 of the present embodiment implements instructions that support object management in the CMS 10. Such instructions include first instructions to notify the object manager 30 whenever a pointer to the instance data 72 for an object 52 can be used to modify the contents of the object 52. Such instructions also include second instructions to convert from a handle 68 to a pointer to the instance data 72. The second instructions are also used for "object faulting", as will be discussed in more detail below. Essentially, the second instructions examine the object descriptor 70 of an object 52 to determine if the instance data 72 for the object 52 has been loaded into memory. If not, the instance data 72 is loaded and the object descriptor 70 is adjusted to include a reference to the loaded instance data 72.

As should be understood, the model 16 of the present embodiment is intended to be heterogeneously portable across differing platforms 19, and the virtual machine 24 of the present embodiment is necessary to interface the model 16 to a particular platform 19. However, one skilled in the art will recognize that in certain circumstances it may only be necessary that the model 16 be homogeneously portable across substantially similar platforms 19. For example, it may be the case that only one kind of work station will be used to access a model, and a user is willing to limit the model to the one kind of work station.

In such a circumstance, the need for a virtual machine 24 is lessened if not eliminated. Instead, only a loader is required to load a model 16 from a storage device, and a translator or an interpreter may be required if the model 16 is not in a platform-specific native code. Of course, one skilled in the art will recognize that such a homogeneously portable model 16 may be employed while still being in the spirit and scope of the present invention.

Portable Programs

Figure 14:
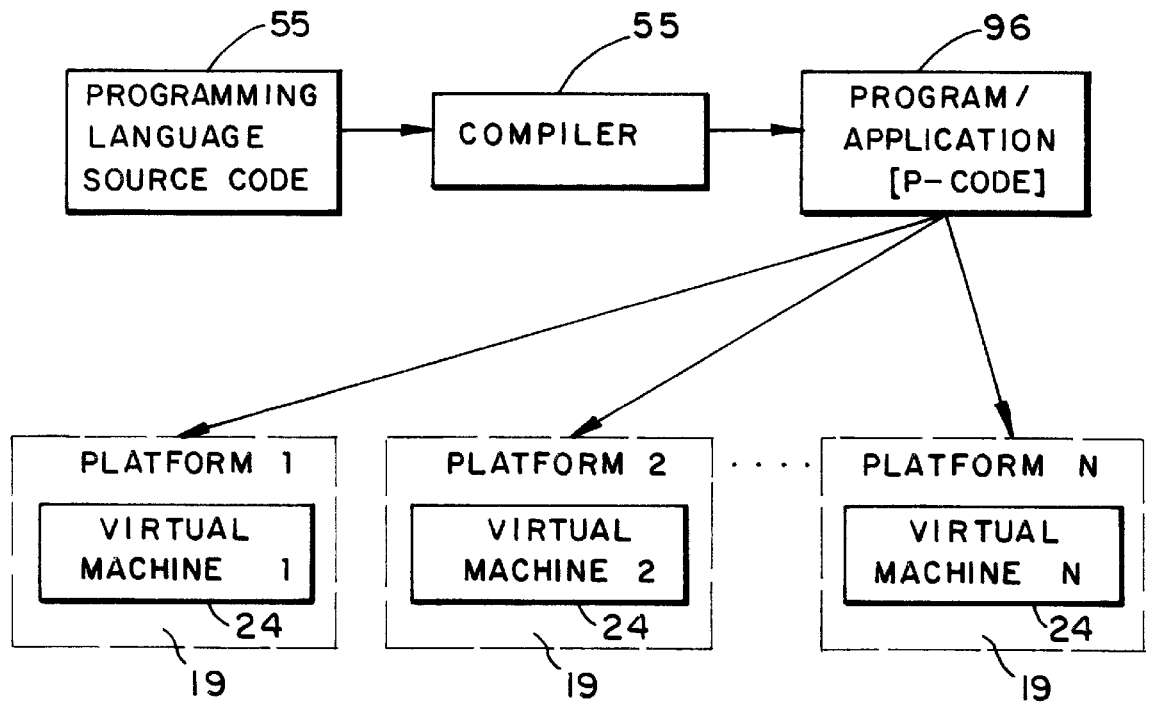
FIG. 14 is a block diagram showing a compiled program that can be run on multiple different platforms in the preferred embodiment of the present invention, each platform having a platform-specific virtual machine.

Preferably, and referring now to FIG. 14, each program or application 96 produced by the programming language 53 and the compiler 55 of the present embodiment is portable in the sense that the program 96 can be compiled on one platform 19 and run on other platforms 19 with different operating systems 20 and/or different computer hardware 22. Preferably, each program 96 is compiled into an efficient byte code format such as p-code (i.e. pseudo-code).

In the present embodiment, and as was discussed above, the virtual machine 24 is part of the CMS kernel 12 and is therefore written in native code. Accordingly, for each type of supported platform 19, the virtual machine 24 and the CMS framework 14 are tailored specifically to such platform 19, and software must be provided for each type of platform 19 to generate such CMS framework 14 and virtual machine 24.

Preferably, a program 96 that is to be run on the virtual machine 24 of the present embodiment contains code segments, initialized data segments, descriptions of non-initialized segments, relocation information, and additional information that is required for transforming the program 96 to run on any supported platform 19. Specifically, such additional information includes a complete description of all of the data types used by the program 96, and descriptions of all variables used by the program 96. The variable descriptions are required so that the layout of variables can be changed across platforms 19, ensuring that both the layout of the variables and their data sizes are correct. Further, such additional information includes relocation information used to find all of the places in the code that are affected by the information described in the type system or list of variables.

As should be understood, the portable representation of a program 96 requires additional information that a traditional program does not require. In fact, such additional information may be significantly larger than the actual program 96 contained in the program file. Therefore, such information must be efficiently stored.

It is important to avoid duplicating information in multiple programs 96. For example, if a program A uses a class 54 that is already implemented by another program B, then all of the type information should be provided by program B and not program A. If program A implements a class 54 that is derived from a class 54 implemented in program B, then program A should only contain a description of the parts of the class 54 not contained in program B.

Often, a section of a program file is essentially an array of instances of some structure. Similar types of data are saved in the same structure, but different portions of the data may be unused depending on the specific data. Rather than dumping the entire structure to a file, it is preferable that the data in the structure be dumped in the form of a compacted stream, if at all possible, that can be recognized and reconstructed.

Preferably, only changes in values in a data stream are stored. As should be understood, such a technique is especially useful when a program 96 has many instances of a particular type of data, but each instance does not vary much from adjacent instances in a data stream. In such a situation, it is preferable that such data be represented with segmented specifiers.

Figure 15:
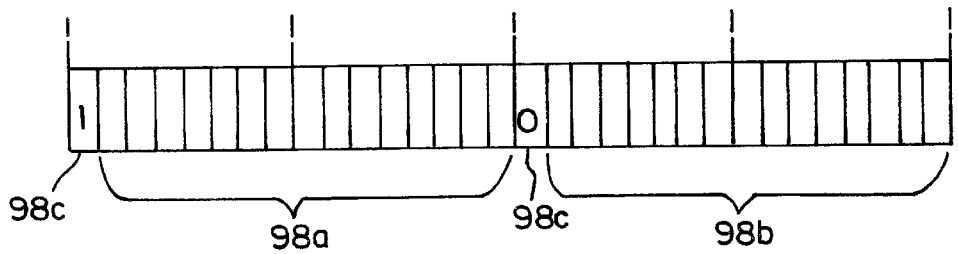
FIG. 15 is a diagram showing a data value apportioned according to a segmented specifier in the preferred embodiment of the present invention.

For example, and referring now to FIG. 15, if a list of 30-bit values is to be dumped to a file, each 30-bit list value may be divided into a 15-bit more significant field ("segment value") 98*a* and a 15-bit less significant field ("offset value") 98*b*, where the segment value is arranged into a 2-byte field with a flag bit 98*c* set to 1 and the offset value is arranged into a 2-byte field with a flag bit 98*c* set to 0. Accordingly, the segment value 98*a* need only be stored if such segment value 98*a* changes as between adjacent list values.

Figure 16:
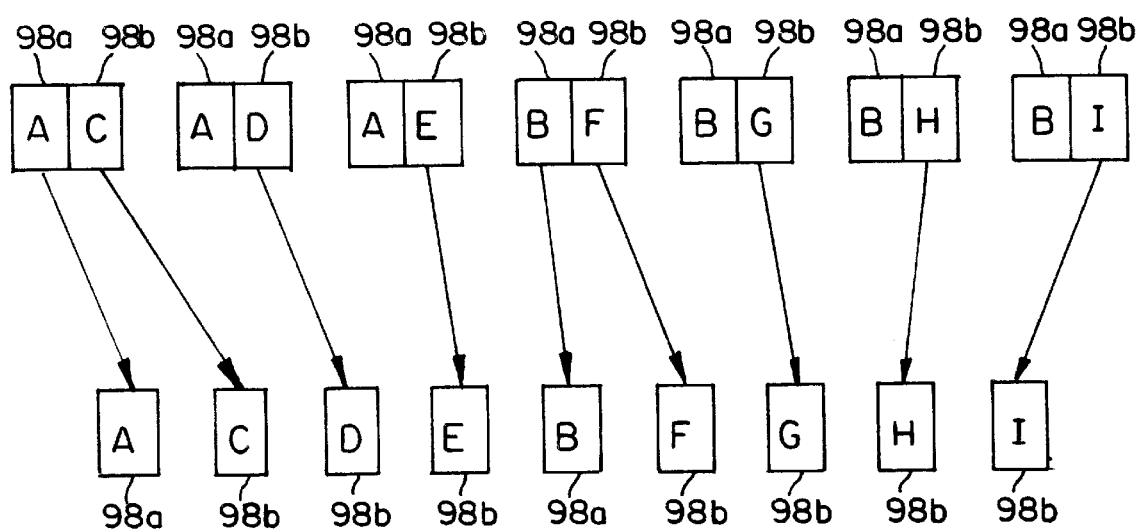
FIG. 16 is a diagram showing a list of data values apportioned according to a segmented specifier in the preferred embodiment of the present invention, where the apportioned data values are organized to be stored.

Thus, and as shown in FIG. 16, if a list contains seven values where the first three list values share a first common segment value 'A' and the last four list values share a second common segment value 'B', the list can be stored as the first segment value 'A', the first three offset values 'C', 'D', and 'E', the second segment value 'B', and the last four offset values 'F', 'G', 'H', and 'I'. More importantly, when loading the stored list of values, the flag bit 98*c* for each 2-byte value determines whether the value is a segment value 98*a* or an offset value 98*b*, and the list can be reconstructed accordingly.

Preferably, data is organized intelligently based on segmented specifiers. Accordingly, data should be classified so that each classification has a different segment value 98*a*, and segment values 98*a* rarely change in a stream of such data. Preferably, when the order of data is not important, such data can be sorted such that the use of segmented specifiers optimizes the storage and retrieval of such data.

As one skilled in the art should now recognize, many different variations of segment specifiers may be employed without departing from the spirit and scope of the present embodiment. For example, in some cases it may be better to use a 1-byte offset value 98*b* and a 3-byte segment value 98*a*. As should be evident, segmented specifiers may be employed for any type of data that is organized as pairs.

To adjust for differences in how data is handled on different platforms 19, it is preferable that a program 96 that runs on the virtual machine 24 of the present embodiment have a complete description of the data types employed. As should be understood, such description is required to fix up the layout of data definitions. Such information is also required by the persistence manager 30, as will be discussed below.

After a program 96 is loaded, information in the program 96 must be fixed up ("relocated") before execution. More specifically, relocation in the CMS 10 of the present embodiment involves modifying instructions and data to reflect where in memory the program 96 is loaded, resolving symbols from other programs 96, and taking into account other differences across platforms 19.

As one skilled in the art should appreciate, information to be fixed up at run-time includes offsets of frame variables, segment pointers, addresses of global variables and functions, and address of variables and functions resolved from dynamic libraries. Also, member offsets must be fixed since the layout of structures and classes 54 may be different at run-time than at compile-time, either because the program 96 is being run on a different type of platform 19 than that on which the program 96 was compiled, or because members have been added to a base class 54. Further, since some instructions may rely on the size of a type, it may be necessary to fix such instructions at run-time.

Conversely, register variables and function arguments are preferably allocated the same way regardless of platform 19 and therefore need not be fixed up at run-time. Since both are restricted to integral and floating point types, the offsets of these variables cannot be affected by the changes in structure sizes.

Preferably, relocation is performed "up-front" when a program 96 is loaded, and memory used for relocation information is freed once relocation has ended. However, such up-front relocation requires appreciable processing time that may be perceived as a delay by a CMS user. Accordingly, relocation for a given instruction or function may be deferred until the instruction or function is executed.

Relocation information is preferably stored as a stream of relocation commands. Accordingly, the relocation information is a prime candidate to benefit from segmented specifiers. Three groups of commands are required for each type of information to perform the relocation on an instruction or variable: (1) a pointer to the target segment that contains the target data, i.e. the data that is to be modified as a result of the relocation; (2) an entry that specifies the data that is to be stored in place of the target data; and (3) an entry that specifies the size of the target location and an offset from the start of the target segment.

Since large groups of relocation commands will refer to the same segment, the relocation commands are preferably grouped by target segment. Accordingly, one command specifying the target segment applies to all subsequent commands until the next command specifying a target segment such that no segment is specified more than once.

The subsequent relocation commands are arranged as pairs of groups. Within each pair, the first group contains commands that specify how to compute the value that is to be stored in the instructions or variables (i.e. the relocation value). The second group specifies how to store the data. The first group sets the relocation value to either the address of an identifier representing a function or variable, the offset of a member variable 60 in a class 54 or structure, or the size of a type retrieving the size of a type.

More than one relocation command may be necessary to compute a relocation value if, for example, an instruction makes a nested reference to a member of a structure. Specifically, if the source code contains a reference 'myData.member1.member2', then one instruction is used to retrieve the data for such reference. As should be understood, such instruction must be fixed up to take into account the address of 'myData' plus the offsets for both 'member1' and 'member2'

To handle such a situation, it is preferable that relocation commands are able to both set and add to a relocation value. In such a case, the compiler 55 would generate a relocation command that sets the relocation value to the address of the variable myData. The compiler 55 would then generate relocation commands that add the offsets of member1 and member2 to the relocation value.

The commands in the second group store the value computed by the command in the first group by including relocation data that specifies a type of operand and offset into the segment. Preferably, if a relocation value is to be stored in more than one location, chaining is employed. As should be understood, if the next location and the current location are close enough that the distance can be saved in the current location, the current location is employed to save the offset to the next location. If the next location is not close enough, another command is added to the group of commands specifying where the current relocation value should be stored. As should now be evident chaining through the data reduces the size of the relocation data.

Every element (i.e. class, template, function etc.) has an identifier. Preferably, identifier information is available at run-time in the form of a list of identifier entries which serve as a focal point for all of the information regarding a function or variable. For example, reference can be made to the list of identifiers to determine how to layout memory segments at run-time. Relocation entries can refer to identifier entries to derive relocation values. A shared library can employ identifier entries to retrieve addresses of functions and variables that are being made available to other programs 96.

Depending on how an identifier entry is to be employed, different information is required on the identifier entry. To support portability, the loader (i.e. the part of the CMS kernel 12 that loads a program 96) (not shown) must know the offset, type, and segment for all identifiers. For some identifiers, the loader may also need to know how a symbol is to be resolved. For each frame identifier (i.e. an identifier for a variable that occurs within a function and is applicable only to the function), the loader must know the scope of the variable. For register variables, the loader must know the offset.

Preferably, identifiers are grouped according to certain attributes such that segmented specifiers or the like may be employed. As should be understood, run-time code that processes such grouped identifier entries is simpler and more efficient. Typically, all of the identifiers in a group are processed in the same manner. Accordingly, code that processes only a specific group need only be directed to that group, and multiple passes over the various groups can be avoided.

Preferably, a list of identifiers that are exported (i.e. made available to other programs 96) is maintained apart from the identifier groups. Such identifier entries should riot be grouped since the export feature is usually not the most significant feature of the identifier. Instead, the list of identifiers is preferably indexed to the grouped identifier entries.

As one skilled in the art should recognize, a block of source code or "scope" in a C-type programming language starts with a '{' and continues until the compiler 55 encounters the matching '}'. A frame variable is "in scope" until the block ends. As should be understood, scope information is necessary when allocating frame variables at run-time.

A scope may be described by type (i.e. function or a block within a function), name (if the scope is a function), starting and ending offsets to identify the instructions that are in the scope, range of source code line numbers, and a list of identifiers that are defined in the scope, among other things. However, for a program 96 to be portable for different platforms 19, it is preferable that the only required data is the list of identifiers defined in the scope, and the ranges of the instructions. As may be understood, the list of identifiers is required so that frame variables can be allocated, and the ranges of instructions is required to determine nesting relationships with other blocks.

As one skilled in the art should recognize, an initialized data segment is a data segment that has been statically allocated at compile-time. For example, initialized data segments include mathematical constants and statically allocated objects 52 (discussed above in connection with embedded objects 52S). Upon loading initialized data segments, a loader must convert the data to the format required for the platform 19 where the program 96 will run. To facilitate such process, it is preferable that the data be organized into separate segments for each data type. Accordingly, segmented specifiers may be employed, and each data type in a segment is converted in the same manner.

As should be evident, data conversion is more difficult when complicated structures are involved. In such a situation, it is preferable that a list of identifiers is provided which describes each structure in a segment, and the list is employed to create data conversion operators that describe the transformations needed to convert the data for the target platform 19. As should be understood, conversion may involve fixing byte order (i.e. whether the most or least significant byte of a value is first) and/or moving data if the structure layout is different on the target platform 19.

Preferably, the loader of the CMS kernel 12 of the present embodiment loads the different sections of a portable program 96 according to the following procedure:

Load the header file for the program 96. As should be understood, the header file includes information on the characteristics of the platform 19 where the program 96 was built, including byte order in the program 96.

Load all data used to describe the program 96, including directories to the remainder of the program 96, a string pool, type information, groups of identifier entries, initialized segments, information on scopes, a list of dynamic libraries, relocation information, a list of identifiers to be made available to other programs 96, and data structures that must be initialized to install classes 54 and interfaces 56 from the program 96.

Initialize the type system calculating the sizes and alignment for all of the types.

Load initialized segments. As should be understood, all of the segments are in external format. No relocation has as yet been performed and none of the data has been adjusted to match the layout rules for the target platform 19.

Process all identifiers, calculating the sizes of the variables on the target platform 19.

Calculate conversion operations for segments containing initialized data.

Allocate internal images of all segments. As may be understood, such allocation is only necessary for segments that have a different size than the external format, including segments that have no initialized data, have truncated initialized data, or have initialized data that cannot be converted in place.

Using the addresses of the internal images of all of the segments, set base addresses for groups of identifiers.

Load all scopes and calculate offsets of all frame variables.

Load all dynamic libraries including all required shared libraries.

Fix byte order in all segments.

Apply relocation information.

Copy segments from external segments to internal segments, adjusting data layout as necessary.

Record information required to export symbols.

Load descriptions of data employed to install classes 54 and interfaces 56 from the program 96.

Object Management

As was discussed above, an object 52 is an instance of a particular class 54. As shown in FIG. 6, a class declaration 64 for a class 54 defines the data structure of an object 52 instantiated from the class 54. That is, the instance data 72 which is associated with any object 52 of the class 54 is laid out and interpreted according to an instance data definition 100 for the class 54. The class declaration 64 for a class 54 also declares a set of methods 62 which can be applied to any object 52 instantiated from the class 54. All objects 52 of a class 54 share the same instance methods 62. However, each object 52 is a distinct entity with its own storage for instance data 72.

As was also discussed above, and as shown in FIG. 8, every object 52 is represented by an object descriptor 70 which has references to instance data 72 for the object 52 and a class object 52C that embodies the class declaration 64 for the class 54. Instance data 72 for a first object 52 may include a reference to a second object 52 by pointing to the object descriptor 70 for the second object 52. Preferably, the virtual machine 24 of the present embodiment allows an object pointer to refer to an object 52 of a different class 54, and determines the class 54 of the referred-to object 52 dynamically at run-time whenever access to the member variables 60 or methods 62 of the object 52 is required.

As also shown in FIG. 8, instance data 72 is associated indirectly with the object descriptor 70 of an object 52 by way of an instance data reference 74 in the object descriptor 70 for the object 52. Accordingly, instance data 72 may be reallocated, deleted from memory, or swapped out of memory temporarily without disturbing any references to the object descriptor 70 by way of the handle 68 for the object descriptor 70.

Since an object pointer holds the address or handle 68 of an object descriptor 70, and not instance data 72, an object pointer cannot be manipulated like a structure pointer. In particular, an object pointer is not assignment compatible with or convertible to any other kind of pointer. Therefore, addresses derived from an object pointer cannot be used for data access in any way, and object pointer arithmetic cannot be reliably performed based on an object pointer.

As explained above in connection with embedded objects 52S, the instance data definition 100 of a class 54 may also be used to declare an embedded object 52S (i.e. a statically allocated embedded object). An embedded object 52S is not represented by an object descriptor 70. Instead a temporary object descriptor 70T is created to allow the embedded object to invoke instance methods 62. However, a temporary object descriptor 70T is not required to access the member variables 60 of an embedded object 52S.

Preferably, and again referring to FIG. 8, the object descriptor 70 for each persistent object 52 in the model 16 can have a back-pointer reference 78 to a list of back-pointers 80. As seen, each back-pointer for a target object 52 (represented by OBJECT DESCRIPTOR 2 in FIG. 8) refers to a source object 52 (represented by OBJECT DESCRIPTOR 1 in FIG. 8) that includes as instance data 72 a pointer 101 to the target object 52. Preferably, the list of back-pointers 80 for a target object 52 is maintained independently of the instance data 72 for the target object 52.

However, if a target object 52 holds only one back-pointer 80, the object descriptor 70 for the object 52 preferably includes a reference directly to the source object 52, without requiring a back-pointer list 80 to be created. Accordingly, overhead memory for such unnecessary back-pointer list 80 is avoided.

A back-pointer list 80 for a persistent object 52 is preferably created on demand, and the list can be dynamically extended as necessary. Preferably, the list of back-pointers 80 for a target object 52 is updated whenever a reference to the target object 52 from a source object 52 is added or deleted. The list of back-pointers 80 for each object 52 must be current by the end of a transaction, when the model 16 must be in a consistent state for purposes of change validation, to be described below. Preferably, the transaction manager 46 of the framework 14 performs back-pointer maintenance automatically as part of change validation. A CMS programmer or user may also call run-time system functions to update a back-pointer list 80 at other times.

Figure 19:
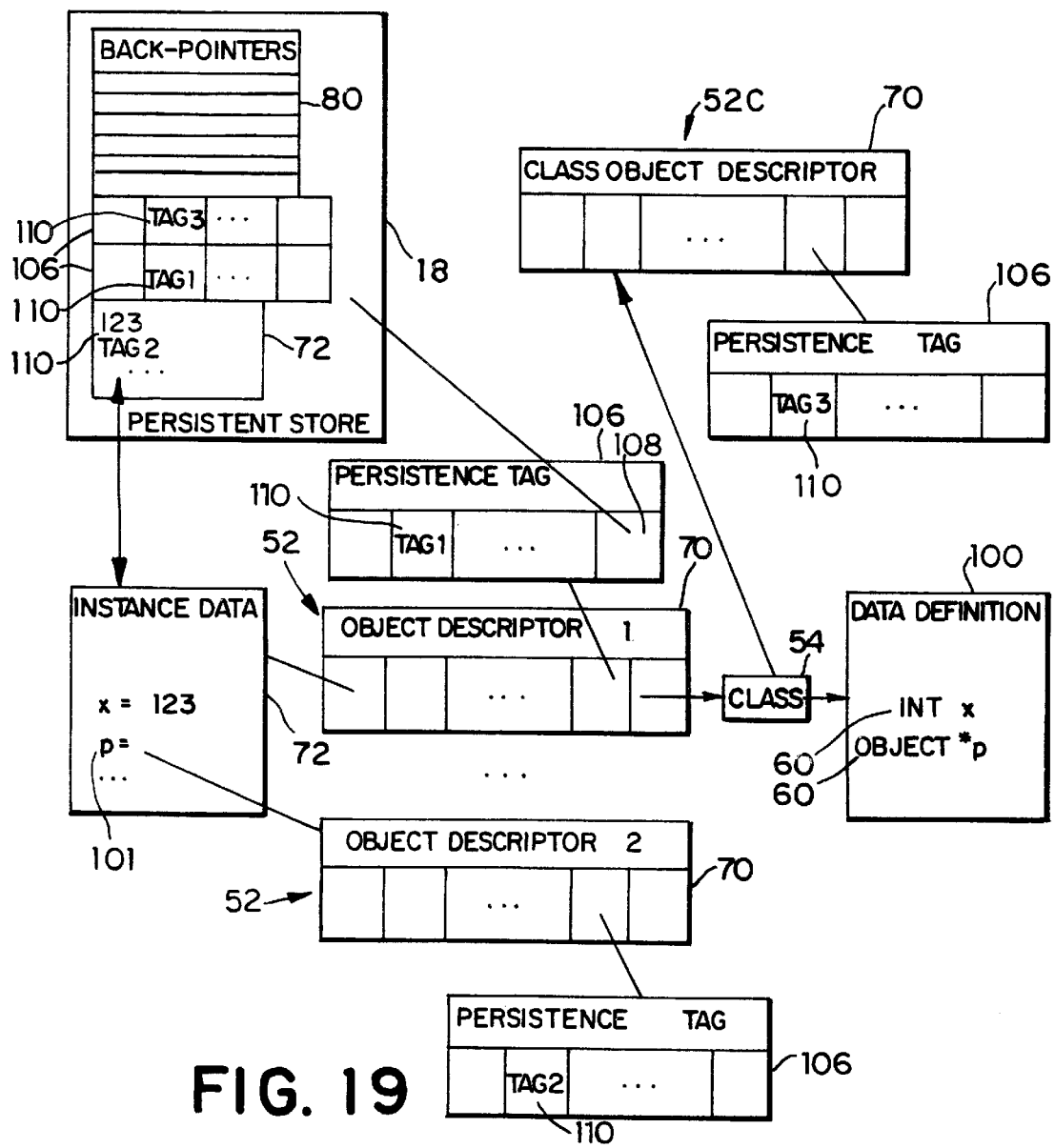
FIG. 19 is a block diagram showing a persistent object stored in a persistent store in the preferred embodiment of the present invention.

To maintain the integrity of a model 16 based on persistent objects 52, the list of back-pointers 80 for each object 52 must be made persistent with the object 52 (as shown in FIG. 19) such that known dependencies of other objects 52 are preserved. Accordingly, when the object 52 is loaded from a store 18 and changed, dependent objects 52 are also loaded (if necessary) and then notified of the change.

As should now be understood, the list of back-pointers 80 is necessary along with "forward" pointers 101 to maintain two-way references between objects 52. For example, if a "source" object 52 holds a pointer 101 to a "target" object 52 and the target object 52 is to be deleted or changed, the target object 52 needs a back-pointer from the back-pointer list 80 to the source object 52 to notify the source object 52 of such deletion or change. Accordingly, the source object 52 may react to such deletion or change in a pre-defined manner according to methods 62 associated with the source object 52.

Specifically, when data for an object 52 has been modified, data in dependent objects 52 may also have to be modified. Moreover, other data in the modified object 52 may have to be modified. Preferably, such modification occurs during a "validation" procedure that is deferred until an appropriate time. To facilitate such deferred validation, it is preferable that whenever an object 52 is modified, the "change bit" 102 in the object descriptor 70 for the object 52 is set, as seen in FIG. 12 and as was discussed above. Accordingly, the modified object 52 is scheduled for deferred validation. Preferably, the validation process is performed at the end of each transaction and is initiated by the transaction manager 46 of the framework 14.

Figure 17:
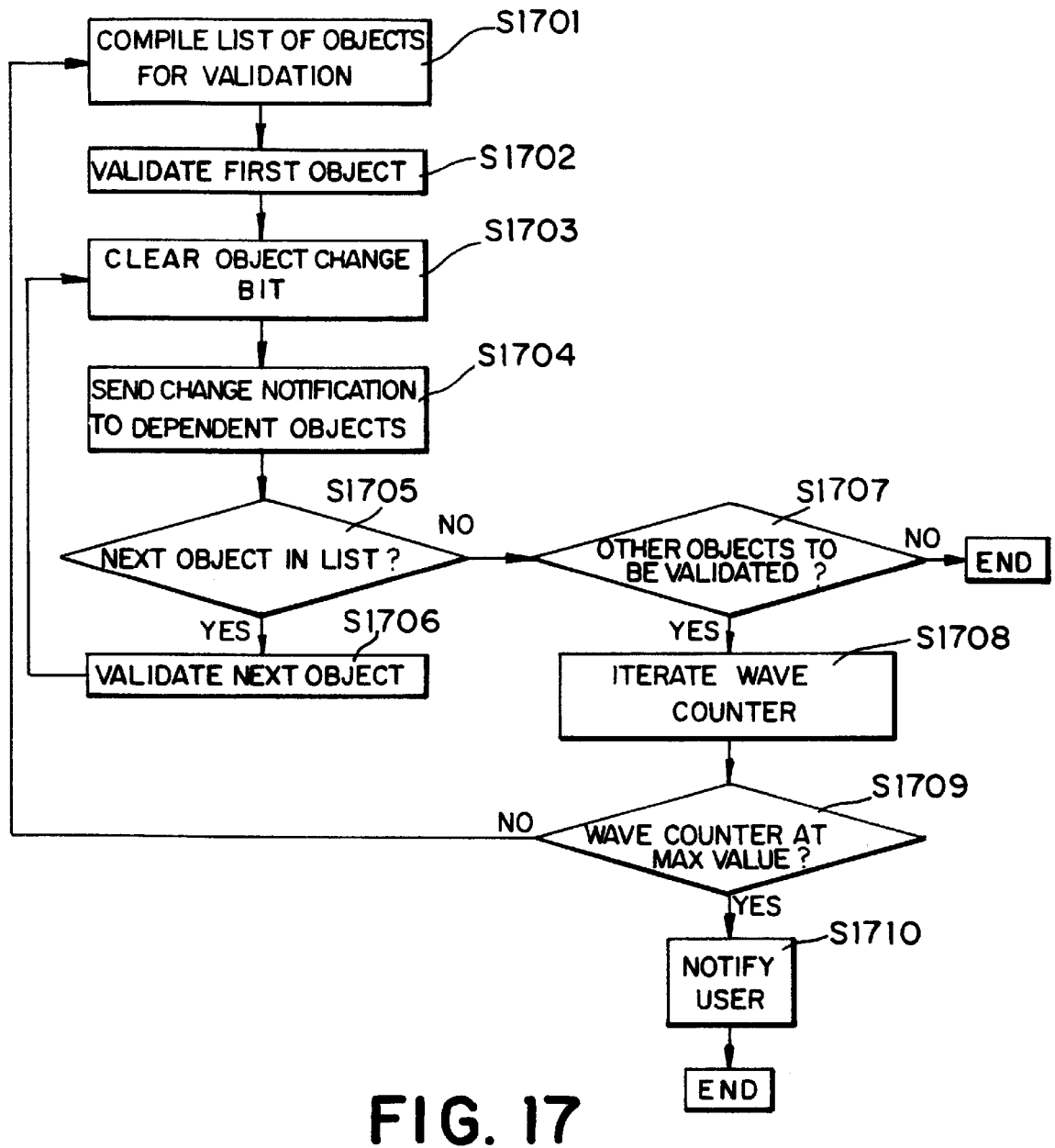
FIG. 17 is a flow diagram showing the validation process in the preferred embodiment of the present invention.

After all direct changes have been made by a CMS user, a run-time system function is called to start the validation process. Preferably, and as shown in FIG. 17, the validation process starts with the compilation of a list of objects that: are to be validated (S1701). Each object 52 has a validation method which is invoked when the object 52 is validated. After the first object 52 in the list is validated (S1702), the change bit 102 for the object 52 is cleared (S1703) and a change notification is sent to each source object 52 on the back-pointer list 80 for the cleared object 52 (S1704). If there is a next object 52 on the list to be validated (S1705), the next object is validated (S1706), the change bit 102 for the next object 52 is cleared (S1703) and a change notification is sent to each source object 52 of the cleared next object 52 (S1704). As should now be understood, each additional object 52 in the list is similarly validated.

Since validation of one object 52 may produce further modifications to other objects 52, the validation process preferably proceeds in waves. Specifically, once the end of the list is reached, the validation process determines whether other objects 52 must be validated as a result of the preceding validation wave (S1707). If so, a next validation wave (steps S1701–S1706) takes place. As may be understood, then, the same object 52 may be validated more than once in a single validation process. The process continues until no more objects 52 are marked changed, or until a maximum number of iterations has been reached (i.e. to avoid cycling). Accordingly, it is preferable that a wave counter be iterated (S1708) before each subsequent wave, that the validation process be terminated if the wave counter reaches a predetermined maximum value (S1709), and that the CMS user be notified (S1710) if the validation process has terminated to avoid cycling.

Preferably, a CMS user may add consistency rules to an existing schema 50, and the consistency rules are invoked during the validation process. Such consistency rules are typically associated with an object 52 or a class 54, and may for example limit a member variable 60 to a predetermined range.

If an invalid change is detected during the validation process, an "exception" is preferably signaled. An exception during the validation process preferably triggers the transaction manager 30 to reverse all effects of the current transaction.

Object Persistence

The potential lifetime of an object 52 likely will exceed a single CMS user session. Accordingly, the object 52 must be made "persistent". Preferably, the programming language 53 of the present embodiment is a "persistent programming language" which makes persistence non-class-based and which manages object storage and retrieval transparently. For a definition of persistent programming language, see Antony L. Hosking and J. Eliot B. Moss. "Object Fault Handling for Persistent Programming Languages," Proceedings ACM Conference on Object-Oriented Programming Systems, Languages and Applications. Washington, DC, September. 1993, pp. 288–303, hereby incorporated by reference. To achieve true object-oriented persistence, each persistent object 52 in the model 16 is preferably assigned a unique, persistent identity.

Figure 18:
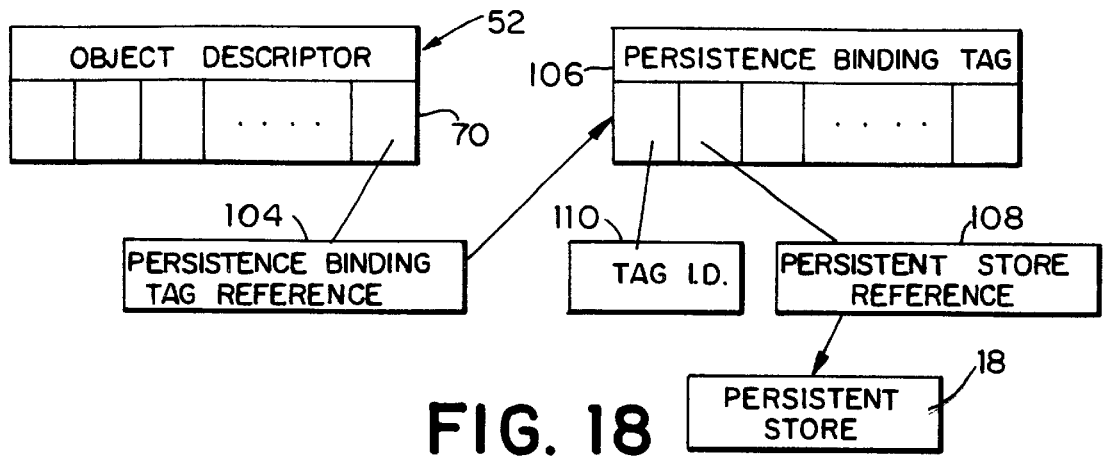
FIG. 18 is a block diagram showing the persistence binding mechanism for binding a persistent object to a persistent store in the preferred embodiment of the present invention.

As shown in FIG. 18, the persistence manager 30 in the CMS kernel 12 preferably binds an object 52 to a particular persistent store 18 by creating an explicit linkage between the object descriptor 70 of the object 52 and the store 18. More particularly, the object descriptor 70 contains a persistence binding tag reference 104 to a persistence binding tag 106 that in turn contains a persistent store reference 108 to the particular persistent store 18. Preferably, the persistence binding tag 106 also has a tag ID 110 for the object 52 that is unique in the persistent store 18.

Preferably, persistence is an optional property which can be added to any object 52. An object 52 that has not been bound to a store 18 is transient and will have no persistence binding. A non-persistent object 52 can be made persistent by binding such object 52 to a store 18, and a persistent object 52 can be made transient again by dropping such object 52 from the store 18. Accordingly, an object 52 can be "moved" from one store 18 to another if so desired. Preferably, any object 52 which is referenced by a persistent object 52 will be made persistent automatically, as explained below.

The tag ID 110 of a persistence binding tag 106 of a persistent object 52 is preferably assigned to the object 52 at the time the object 52 is first bound to a store 18, and is unique within the store 18. A persistent object 52 can therefore be queried for its tag ID 110, while a non-persistent object 52 cannot be similarly queried. An object 52 can be bound to at most one store 18 at a time.

Preferably, storage of instance data 72 is done automatically using the data definition 100 specified for the class 54 of the object 52, as illustrated in FIG. 19. Since the class 54 of an object 52 may be a derived class 54 and the data definition 100 of the class 54 includes the data definition 100 of a base class 54, it is preferable that the combined data definition 100 be detected and that the object instance data 72 be saved accordingly. Nevertheless, a schema developer may extend or override such data storage mechanism selectively if the structure-oriented data definition is too restrictive. As a result, persistence of a single object 52 may be partly handled by system logic and partly by custom logic, and custom logic may be introduced by multiple derived classes 54 in a modular way.

Preferably, the CMS 10 of the present embodiment supports the automatic reading and writing of all data types by the object/persistence manager 30 of the CMS kernel 12. Nevertheless, it may be the case that certain "C" data types such as unions, bitfields, and non-object pointers are not supported. Accordingly, if a class 54 introduces unsupported member variable types, such class 54 must also provide methods for serializing its state. As should be understood by one skilled in the art, an example of a class 54 which uses serialization is a class 54 that includes a definition for a variable-length list data structure, which keeps a resizable array of data in dynamic memory, plus a count. When storing and loading an object 52 of such a class 54, the CMS 10 preferably defers to the array to serialize its data members, based on the count.

A designer of a class 54 may wish to control how the state information introduced by the class 54 is stored. For example, and as one skilled in the art should appreciate, the designer may want to compress a rotation matrix variable to a quaternion representation on disk. Preferably, each class 54 can take over control of the storage of defined member variables 60 from the persistence manager 30 by defining two specially named methods, 'StoreSubStore' and 'StoreSubLoad'.

For example, if a class 'B' is defined to include a member variable 60 of a type which is not supported by the persistence manager 30, such class B must also define the methods 'StoreSubStore' and 'StoreSubLoad' to allow for storage of the unsupported type: class B :

```
Object
{
char *m_p;      //    unsupported data type
void StoreSubStore (DataStream*);
void StoreSubLoad (DataStream*);
};
```

The persistence manager 30 detects and invokes such methods whenever instances of class B are written to or read from disk. Accordingly, such methods become an extension of the persistence manager 30 without which objects 52 of class B cannot be persistently managed.

Overriding is preferably incremental. Each derived class 54 in a class hierarchy can control storage of the portion of the instance data 72 defined by such derived class 54, independently of other derived classes in such class hierarchy. Preferably, the CMS 10 of the present embodiment supports a mixture of standard and customized storage of instance data 72 within a single class 54. When loading and storing instance data 72, the persistence manager 30 automatically handles instance data variables introduced by derived classes 54 within a class hierarchy which do not implement serialization, and invokes the serialization methods of all derived classes 54 that do implement serialization methods in top-down hierarchy order.

As seen in FIG. 19, since each persistent object 52 has a tag ID 110, object pointers 101 between objects 52 may be saved and restored persistently. To save a pointer 101 from a source object 52 (represented by OBJECT DESCRIPTOR 1 in FIG. 19) to a target object 52 (represented by OBJECT DESCRIPTOR 2 in FIG. 19), where the source object 52 is to be stored in a persistent store 18, it is preferable that the pointer 101 be replaced with the tag ID 110 of the persistence binding tag 106 of the target object 52 ('tag2' in FIG. 19) prior to storing the instance data 72 for the source object 52 in the persistent store 18. Similarly, to resolve the pointer 101 once the source object 52 is restored, the stored tag ID 110 is employed to look up the object descriptor 70 of the target object 52. Such encoding and resolving of pointers 101 and tag IDs 110 ("swizzling"), is preferably done automatically. Only pointers to objects 52 can be swizzled.

Accordingly, if an object includes a pointer to non-object data, the non-object data must be saved with the object 52 by way of the 'StoreSubStore' and 'StoreSubLoad' I/O methods discussed above.

Unlike prior art modeling systems, the integrated persistent CMS 10 of the present embodiment captures and stores the complete definition of each object 52 including a class declaration 64, class methods 62, and instance data 72. Accordingly, a class 54 may be reinstalled and methods 62 may be reloaded from a store 18 as necessary to restore a stored persistent objects 52 to a live, running state. Moreover, by storing objects 52, classes 54 and methods 62 together, the necessary supporting software and resources are always delivered along with objects 52 when the model 16 is copied or moved. Only the CMS kernel 12 is required to open and work with the persistent model 16, regardless of where the model 16 was built or the tools or programs 96 that were used to build such design. Since the model 16 contains everything necessary for execution within the virtual machine 24, the model 16 will continue to work in the future.

Preferably, the persistent model 16 constructed by a CMS 10 of the present embodiment is binary portable in that objects 52 created and stored on one platform 19 may be reloaded and used on another platform 19, without recompiling or conversion of any kind. As was discussed above, however, it is expected that each type of platform 19 must have a platform-specific copy of the CMS kernel 12 to use the persistent model 16.

When an object 52 is added to a persistent store 18, it must be ensured that the class 54 of the object 52 is also persistent in the same store 18. If the class 54 is not persistent, the class 54 must be made persistent, as explained below. Preferably, and as seen in FIG. 19, each persistent object 52 is stored with at least a portion of the persistent binding tag 106 for the object 52 (tag ID 'tag1'), and at least a portion of the persistent binding tag 106 for the class object 52C of the class 54 of the object 52 (tag ID 'tag3'). Accordingly, the stored persistent object 52 includes a persistent reference to the class 54 of the object 52 by which the class 54 can be resolved and possibly reinstalled when the object 52 is restored later.

To make a class 54 persistent in a store 18, the code libraries which contain the definition and implementation of the class 54 must also be persistent in the store 18. If the code libraries are not persistent, the libraries are stored, as explained below. The class 54 is then registered by name, and an entry which represents the class 54 holds a persistent reference to the associated programs 96, which are typically shared libraries. Accordingly, the class 54 can be looked up by name at load time and can be installed.

To make a code library persistent in a store 18, an image of the library is saved as binary data to the store 18. Additionally, all other libraries imported by the code library are made persistent in the same store 18, and dependencies are persistently noted. Run-time system services can then be invoked to load the code program directly from the store 18 at load time, as explained below.

Object instance data produced by each program 96 is preferably stored in a standard, neutral data format, regardless of where such object instance data was created. For multi-byte data, the standard is preferably Little Endian, IEEE format, although one skilled in the art will recognize that other formats may be employed without departing from the spirit and scope of the present invention. Data is usually stored in "packed" (unaligned) form to minimize required memory space.

As should be evident, using a standard format for storage makes translation straightforward: object data being stored is converted from native format into standard format, and object data being retrieved is converted from standard format into native format. Of course, when the native format matches the standard format, no conversion is required. Since the standard format is packed, it is almost always necessary to relocate (i.e. "unpack") instance data to meet native structure alignment rules. Preferably, conversion and relocation are never a concern of the schema 50.

Project Model

Persistence is organized around the concept of a "project". A project is a grouping mechanism for using multiple persistent stores 18 to define a set of related objects 52. The model 16 is a project model that defines a file set that can be moved in entirety or from which individual files can be moved or renamed without breaking links or dependencies among objects 52 and resources within the project.

A project presents a single set of model objects 52 to a CMS user. Preferably, objects 52 in one store 18 can refer to objects 52 in another. All objects 52 are potentially modifiable, as all stores 18 in a project are potentially read/write. Stores 18 may be added to a project as the project progresses and may also be shared among different projects. The project model 16 is therefore a generalization of the concept of reference files in current modeling systems.

The project model 16 also allows for a unified history mechanism for journaling changes to objects 52 across the stores 18 in a project. Such changes are preferably noted in a single project history file. Accordingly, the history mechanism maintains a persistent "undo" buffer for the project.

Figures 20, 21:
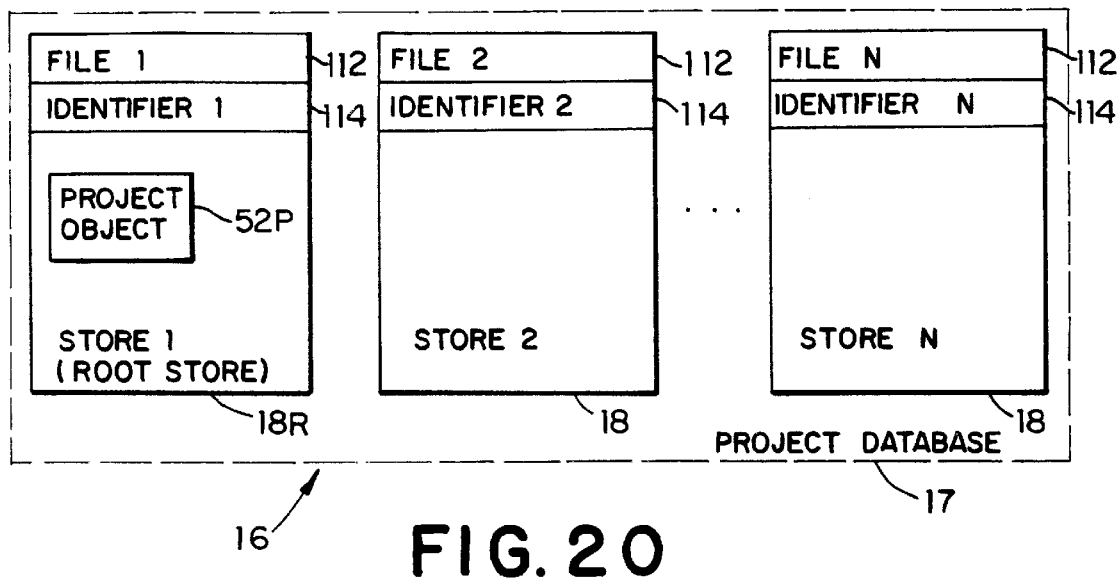
FIG. 20 is a more detailed block diagram of the project database and persistent stores shown in FIG. 1.
FIG. 21 is a table showing the different states of a persistent object in the preferred embodiment of the present invention.

In a project, and as seen in FIG. 20, one store 18 in the project database 17 is preferably designated as the root store 18R. The root store 18R includes a project object 52P which contains the names and file locations of all other stores 18 in the project, plus the name and location of the project history file. The project object 52P is explicitly located by a known persistence binding tag 106 or a special alias. A project is opened, then, by a user identification of the project root store 18R. The CMS kernel 12 can then "bootstrap" the project by connecting to the information in the project object 52P.

The project model 16 insulates inter-file references from file system or network dependencies and allows stores 18 to be renamed or moved without breaking links. Preferably, each store 18 resides in a file 112 and each store file 112 is assigned a persistent, globally unique store identifier 114 which is saved in a header for the store file 112. A reference from a source store 18 to a target store 18, then, is defined in terms of the target store identifier 114 and not by file name and location.

To resolve inter-file references at run-time, the project object 52P preferably maintains a record for each store file 112 that includes the actual disk file name and location and the persistent store identifier 114 assigned to the store file 112. Since the project object 52P is the only place where store files 112 are known by name, a store file name and location must be updated in the project object 52P if the store 18 is moved or renamed, and inter-file references must be within a single project.

Workspace Model

Preferably, the CMS 10 of the present embodiment implements a "workspace" model for working with objects 52, where the workspace model is distinguishable from the project model 16. In the workspace model, methods 62 are employed to modify objects 52 in memory, modified objects 52 are detected and committed as a group to permanent storage in the project model 16, and objects 52 are read from the project model 16 into memory and restored to a running state by the run-time system on demand and transparently through the mechanism of object faulting, as will be described below.

With the above-described workspace model, the corresponding project model 16 always contains a complete, coherent set of objects 52. Also, objects 52 are always "in memory" from the point of view of the CMS programmer and the CMS user. Further, platform memory usage is minimized, and very large models can be manipulated even when memory is limited.

As was discussed above, the CMS kernel 12 of the present embodiment marks an object 52 as "changed" whenever the member variables 60 of the object 52 are modified. Preferably, a "save" operation writes each changed object 52 to the proper persistent store 18 for that object 52. During the write operation, pointers 101 in the changed object 52 are swizzled, and, references to other objects 52 are detected. If a referenced object 52 is not persistent, the CMS kernel 12 automatically makes the referenced object 52 persistent and binds the referenced object 52 to the store 18 of the changed object 52. Accordingly, a CMS programmer need not be concerned with specifically making each object persistent.

Preferably, and with reference to FIG. 21, a persistent object 52 can be in one of three states in the workspace model: potential, where no object descriptor 70 is in memory and the class 54 of the object 52 is not installed in memory; non-resident, where an object descriptor 70 for the object 52 is in memory and the class 54 of the object 52 is installed in memory but no instance data 72 is in memory; and resident, where an object descriptor 70 for the object 52 is in memory, the class 54 of the object 52 is installed in memory, and the instance data 72 is in memory. As should be understood, if instance data 72 is not in memory, such instance data is stored in a store 18 in a storage device.

Preferably, connecting to any object 52 causes the virtual machine 24 to create an object descriptor 70 for the object 52 and to associate the descriptor with the persistence binding for the object 52. If the class 54 of the object 52 is not already installed, the CMS kernel 12 installs such class 54 from the storage device, as described below. The instance data 72 for the object 52 is preferably not read in from the storage device, and the instance data reference 74 in the object descriptor 70 is NULL.

To re-instate the run-time environment (i.e. the class declaration 64) required for the connected-to object 52, the persistent reference for the object 52 is obtained by way of the object descriptor 70 and is followed to the stored entry for the class 54 of the object 52 and then to the required programs 96 which are guaranteed to be saved in the same store file 112. The persistence manager 30 then invokes a run-time system function to load the required programs 96 directly from the store 18. If a program 96 requires any shared libraries, such shared libraries are loaded first. As the libraries are loaded, classes 54 defined in the libraries are installed in the run-time environment. With the connected-to object 52 having an object descriptor 70 and an installed class 54, the object 52 is non-resident.

An "object fault" or object load is preferably triggered whenever the instance data 72 of a non-resident object 52 is accessed. An object fault is handled by the persistence manager 30 of the CMS kernel 12 by allocating memory, reading the instance data 72 for the object 52 from the appropriate store 18 into memory, swizzling the pointers 101 in the instance data 72, and setting up the instance data reference 74 of the object descriptor 70 to the instance data 72 for the object 52. Accordingly, the faulted-in object 52 is resident.

Preferably, the swizzling of the pointers 101 in the instance data 72 of an object 52 causes the CMS kernel 12 to connect to all referenced objects 52, as seen in FIG. 21. Accordingly, object descriptors 70 for such referenced objects 52 are created and classes 54 of such referenced objects 52 are installed. Such referenced objects 52 are left in a non-resident state until faulted in.

When a program 96 opens a project root store 18R, the CMS kernel 12 preferably connects to the persistent project object 52P. The project object 52P contains references to key objects 52 in the project. Therefore, once the project object 52P is faulted in, the high-level objects 52 to which the project object 52P directly refers are connected to and become nonresident, and all other objects 52 in the project are reachable from such key objects 52.

Since all references to objects 52 are to object descriptors 70, and since object descriptors 70 point indirectly to instance data 72, the virtual machine 24 of the present embodiment may discard unmodified instance data 72 and rely on the object faulting mechanism to re-read such instance data 72 when required. Accordingly, allocated memory can be freed up if need be. Note that object descriptors 70 cannot be freed or discarded from memory while still in use.

Preferably, the CMS kernel 12 of the present embodiment allocates all (non-temporary) object descriptors 70 out of a special heap. The heap brokers system memory in large chunks for space and time efficiency. Since the heap is specialized and since object descriptors 70 are all one size, per-descriptor memory overhead is virtually eliminated and allocations and frees can be performed quickly.

As was discussed above, the "save" operation writes a new version of the project model 16, defined as the state of all changed objects 52. Preferably, before a new version is written, the existing state of all changed objects 52 is archived in the project history file which is associated with the project. Accordingly, archived versions of the project model 16 accumulate in the history file. Preferably, the CMS 10 of the present embodiment implements a "roll-back" operation to reinstate an archived version of a project. As should be understood, a roll-back discards all affected objects 52 (making them non-resident) and designates the project history file as the source of data for faulting in such discarded objects 52. Of course, rollback clean up functions must be called before and after a roll-back operation is performed to clean up side effects.

Properties

As one skilled in the art will recognize, many high-level external languages define the concept of a "property", as distinct from a method 62. Essentially, a "property" can be defined as anything that describes a feature of an object 52. For example, if the object 52 is a circle, one property of the circle may be a center point.

Preferably, the CMS 10 of the present embodiment allows a schema developer to define a built-in property by declaring a pair of methods which mediate "get" and "set" access to the value of the property. Accordingly, property access requests may be forwarded to such access methods. Property access methods may also be called directly. A schema developer may then publish methods for built-in properties by using a special naming convention, as is more fully described in SOMObjects Developer Toolkit: Users Guide (Version 2.0), hereby incorporated by reference. The method names may then be parsed to determine the name of the property and to identify the get and set access methods.

In addition to built-in properties, a CMS end user may add properties to an object 52. Preferably, an added property is defined by a name, a data type, and a default value. If the name of an added property conflicts with the name of a built-in property, the added property preferably takes precedence.

Figure 22:
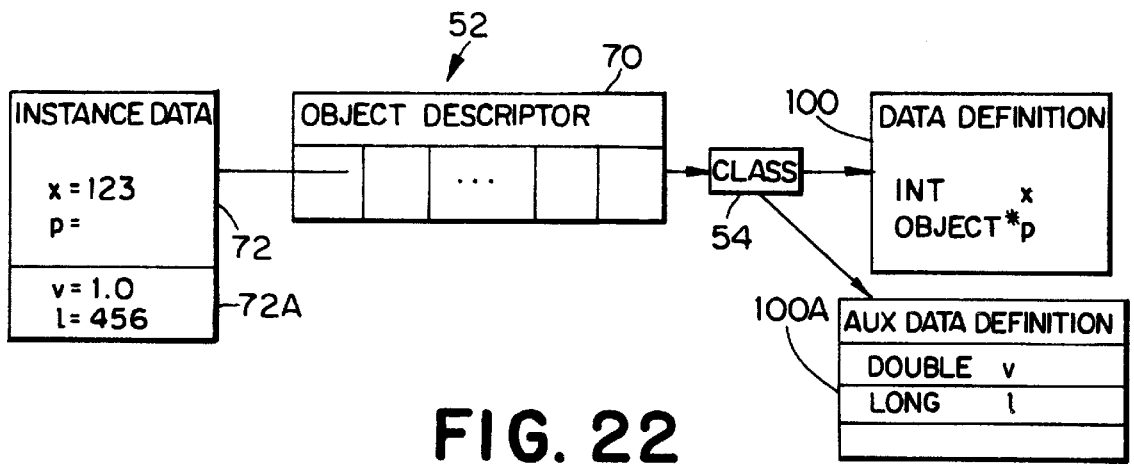
FIG. 22 is a block diagram showing properties added to an object in the preferred embodiment of the present invention.

As shown in FIG. 22, properties are preferably added to all objects 52 of a class 54 by adding an auxiliary data definition 100A to the instance data definition 100 for the class 54, and by appending the property values 72A to the instance data 72 of all objects 52 of the class 54. Per-class property values 72A are persistently stored with each object 52 of the class 54, and the auxiliary data definition 100A is persistently associated with the class 54.

Remote Objects

The preferred embodiment of the present invention described above serves as a technology base to solve a specific modeling problem: managing distributed components or sub-components of a model. The programming language 53, schema environment and persistent model management systems of the present embodiment provide an enabling technology for a new class of CMS component called "remote objects".

In traditional geometry-based CAD systems, files used to model an engineering project typically contain all the constituent components of the model 16. In some cases, it is necessary to reorganize one large file into many smaller files that correspond to logical subdivisions of the engineering project (e.g., reference files). In some cases, these smaller files could be "distributed" out to different server machines, but rarely beyond the expanse of a single local area network since limits are imposed by file system access. Unfortunately, the granularity of these "distributed" subassemblies is always governed by the attributes of the model itself. It is not usually possible to organize and distribute the subdivisions of the model 16 based purely on attributes of the constituent components. Furthermore, these subassemblies were only "distributed" as to their location. In reality, the distinction of location is lost because the full contents and structure of the file must still be visible to the CAD program.

In a CMS, a user or programmer may wish to package components of an engineering model by any of an endless set of criteria and distribute the packaged components to remote locations where the administration of the components is more manageable (e.g., for reasons of available expertise or perhaps security). In such a case, access from the parent model to remotely distributed components may need to be restricted and mediated according to carefully formulated protocols. Accordingly, remote objects 52R (shown in FIG. 23) may be employed to effect the regulated interaction between the local model and its distributed components.

"Remote" in the context of a remote object 52R is a relative term. The "distributed" components may in fact be in the same building or even reside on the same physical machine as the parent model. Access may simply be restricted by the way a file system is set up. Conversely, "remote" might mean that the components reside on a computer on one continent while the model resides on a computer on another continent. In such a situation, an interactive network such as the Internet or the like must be employed as a communications medium between the two computers.

Conceptually, in the CMS 10 of the present embodiment, remote objects 52R have corresponding local and remote portions that represent two "halves" of the same object 52R. Some of the contents of the object 52R may reside locally whereas other parts may reside remotely. As a first example, the local half of the remote object 52R may contain all information relating to geometric representation of the object 52R, while the remote half of the object 52R may contain up-to-the-minute inventory information about the object 52R. As a second example, the local half of the object 52R may contain a complete copy of all information relating to the object 52R, while the remote half of the object 52R is accessed only to update the local half of the object 52R as necessary. The two halves of the object 52R coordinate and communicate with each other through the invocation of methods that are defined and executed in their local context.

The following scenarios describe how the subject matter of the present embodiment applies remote objects 52R to the engineering modeling domain:

Scenario 1—A user wishes to purchase an "off the shelf" component to complete an engineering model. The user logs on to an engineering data gateway (shown in FIG. 24) and queries for all components matching the required component specifications. Preferably, the gateway allows the user to link up to the manufacturer/distributor of the desired component. Once chosen, the schema 50 of the component interacts with the project database of the user.

Scenario 2—A user issues a command for the CMS 10 to generate an up-to-date bill of materials necessary to construct a model 16. Preferably, each component in the bill of materials initiates a link-up to the manufacturer of the component to provide up-to-date pricing and availability information. Thus, the user can be alerted of price changes, problems with availability of the component, and the like.

Scenario 3—A user has a "live" engineering model containing network components on a lap-top or pen computer but is not currently connected to any interactive network. Preferably, the CMS 10 displays the latest version (last refreshed) of the network components. When the user reconnects to a network, the engineering model is once again "live".

The scenarios described above lead to the following requirements. The CMS 10 must be able to query the interactive network for available remote objects 52R and standards governing classes 54 of remote objects 52R. Additionally, the CMS 10 must be able to retain information about the source or origin of each remote object 52R (location on the interactive network) and view a model containing the remote object 52R when not connected to the network. A remote object 52R should be of the same class 54 whether physically local to or remote from the model. Preferably, a refreshed version of a remote object 52R is loaded from the network only occasionally and a user can select when a refresh will occur (immediately, upon demand, daily, weekly, quarterly, etc.).

Figure 23:
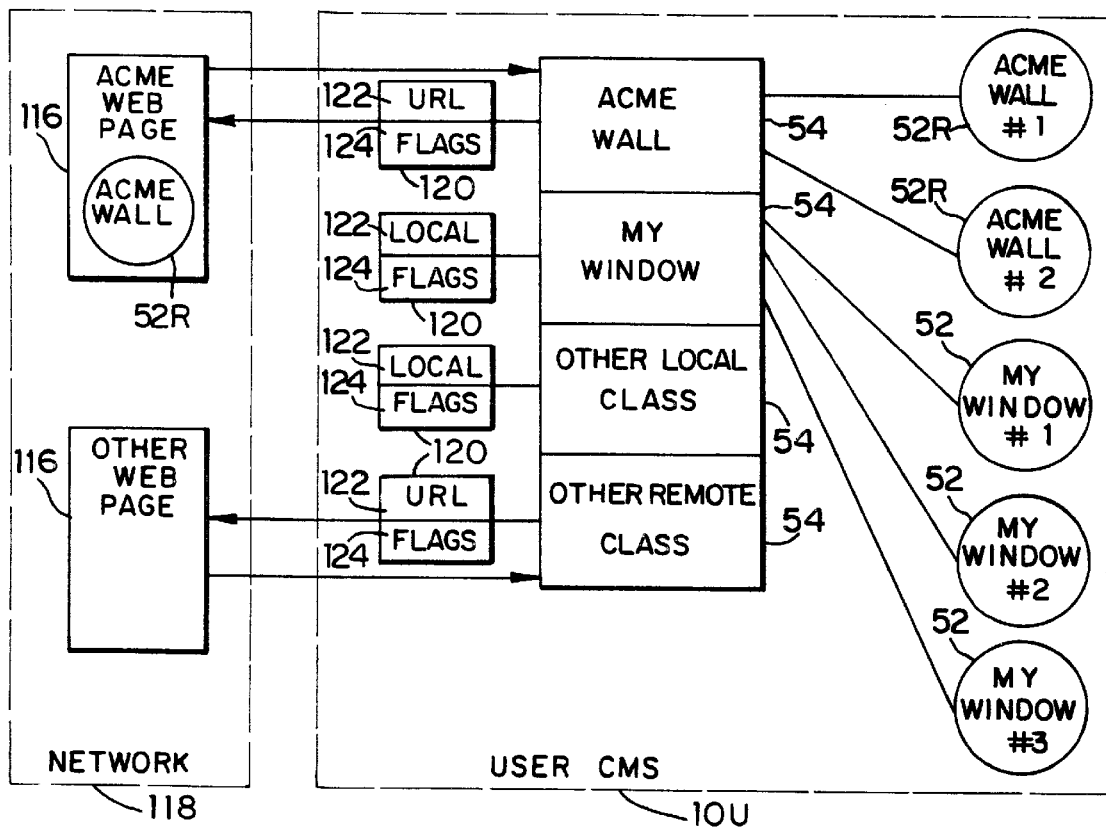
FIG. 23 is a block diagram showing an implementation of the CMS of FIG. 1 that incorporates remote objects.

An implementation of the CMS 10 that fulfills the above-specified requirements is shown in FIG. 23. As seen, a user CMS 10U includes a model 16 and is interfaced to one or more external sites 116 on a network 118 by way of well-known interfacing means. As should be understood, each site 116 contains at least one schema 50 representing available components. Preferably, the connection between the user CMS 10U and the external site 116 is not essential to viewing the model.

As should now be understood, each object 52 in the model contains data representative of a model component, and a reference to the class 54 of the object 52. Each class 54 defines the instance data 72 associated with each object 52 and available methods 62. preferably, for purposes of effectuating remote objects, each class 54 also maintains a reference to an associated class origin object 120. Each class origin object preferably includes location information 122 and flags 124. If the class 54 originates from an external site 116 (e.g., a component manufacturer web site on the Internet), the location information 122 includes a locator for the site 116 such as a universal resource locator (URL), and the flags 124 signifying how often the class 54 should be refreshed from the external site 116. If the class 54 is local to the model, the location information 122 reflects such information and the flags 124 signifying that a refresh operation is not necessary.

If a user request an up-to-the-minute bill of materials, for example, the CMS preferably contacts each external site 116 referenced by a class origin object 120 in the model, and class declaration 64 and/or instance data 72 in the model 16 and relevant to the external site 116 are refreshed. The pseudo-code for a refresh operation is:

```
//  get up-to-the-minute information for each object
in a bill of materials;
    for each object;
        follow class reference in object descriptor
        to class origin object for the object;
        if class origin object shows object
        originated from an external site;
            then contact external site for current
            data;
            else object already has current data;
        end if;
    end for,
//     each object has current data;
generate the bill of materials;
```

Figure 24:
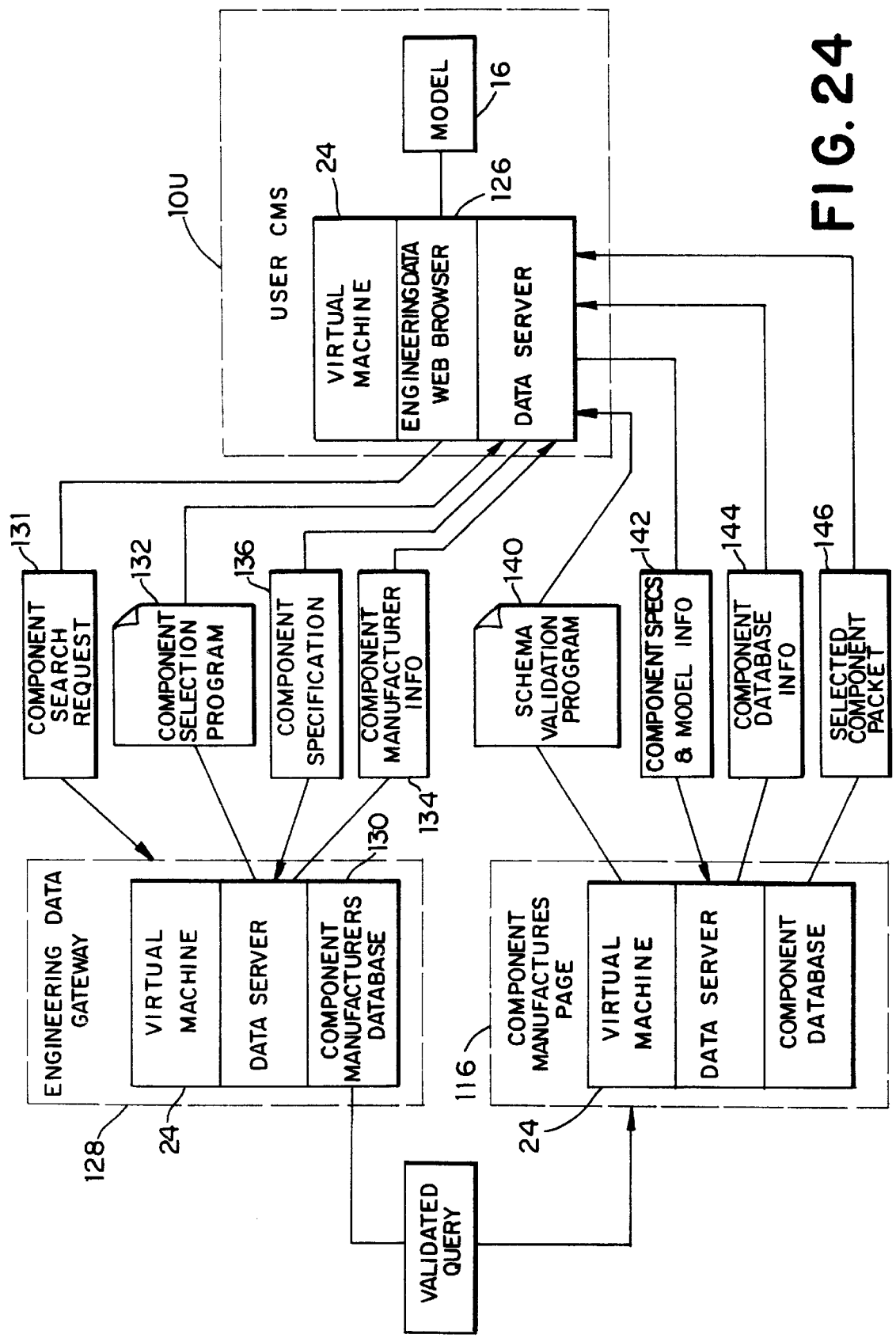
FIG. 24 is a block diagram showing an implementation of the CMS of FIG. 1 that allows a user to find a specific component for a model from an external site.

As shown in FIG. 24, when a user on a user CMS 10U is designing a model 16 and needs to find a specific component for the model 16 from an external network site 116, a browser 126 such as an engineering data web browser is preferably employed to log into a gateway 128 such as an engineering data gateway. As seen, the engineering data gateway 128 has a database of component manufacturers 130 and is running a CMS virtual machine 24 and kernel 12 (not shown). Preferably, the user sends a component search request 131 to the gateway 128, the virtual machine 24 on the gateway 128 downloads a component selection program 132 and component manufacturer information 134 to the user CMS 10U, and the user selects a component manufacturer based on user-defined component specifications 136.

Preferably, the selected component manufacturer has an external network site 116 that is running a CMS virtual machine 24 and a kernel 12 (not shown), and the engineering data gateway 128 turns over control to such site 116. The manufacturer CMS virtual machine 24 downloads a schema validation program 140 to the user CMS 10U, the user provides component specifications 142, and component database information 144 is downloaded to the user CMS 10U. Once a component has been selected and validated by the schema validation program 140, the selected component 146 is downloaded and inserted into the model 16 on the user CMS 10U.

From the foregoing description, it can be seen that the present invention comprises a new and useful computerized modeling system. It will be appreciated by those skilled in the art that changes could be made to the embodiment described above without departing from the broad inventive concepts thereof. It is understood, therefore, that this invention is not limited to the particular embodiment disclosed, but it is intended to cover modifications within the spirit and scope of the present invention as defined by the appended claims.

We claim:

1. A computer system for operating a computerized modeling system (CMS) for constructing a portable persistent model from persistent component objects and for persistently saving and recalling the portable constructed model, each component object being instantiated from a schema class and having a state, the computer system having a computer memory, a plurality of the component objects from the model being resident in the memory, each resident object including:

instance data describing the state of the object; and an object descriptor having an instance data reference to the instance data and a class reference to the schema class from which the object was instantiated;

wherein when a source object has instance data including a reference to a resident target object, the reference is to the object descriptor of the target object.

2. The computer system of claim 1 wherein the object descriptor further includes a dirty bit that is set to signify that the object has been changed and must be written to a persistent store.

3. The computer system of claim 2 wherein the dirty bit is set to signify that the object has potentially been changed and must be written to a persistent store.

4. The computer system of claim 1 further comprising an associated computer storage device, a plurality of the component objects from the model being non-resident in the memory, each non-resident object being instantiated from a schema class and having a state, each non-resident object including:

instance data describing the state of the object and residing in the associated storage device; and an object descriptor having a class reference to the schema class from which the object was instantiated and residing in the memory;

wherein when access to the instance data of the non-resident object is required, the CMS makes the non-resident object resident.

5. The computer system of claim 1 wherein the schema class declares member variables and methods for the instantiated object, the member variables being employed by the CMS to record the state of the instantiated object, the methods being employed by the CMS to access and modify the state of the instantiated object, and wherein the instance data of the object corresponds to the member variables of the schema class.

6. The computer system of claim 1 wherein at least some of the objects are source objects, each source object having instance data including a reference to a target object, and wherein the object descriptor for each target object includes a back-pointer reference to a list of back-pointers, each back-pointer in the list pointing to a source object having instance data including a reference to the target object.

7. The computer system of claim 1 further comprising a class object resident in memory for each schema class, the class object having a class declaration for the schema class including all the methods invoked by all the objects instantiated from the schema class, the class reference to the schema class for the object descriptor of each object being to the class object of the schema class.

8. The computer system of claim 1 wherein each schema class declares member variables and methods for each object instantiated from the schema class, wherein the CMS has a global table of methods including all methods of all schema classes, and wherein each schema class has a dispatch table of methods based on the global table, the dispatch table residing in computer memory, including each method implemented by the schema class, and being based on a multi-tiered sparse array.

9. The computer system of claim 8 wherein the dispatch table is based on a three-tiered sparse array and includes:
- a top tier having a top list with a plurality of entries, each of at least some of the top list entries containing a middle tier reference;
- a middle tier having a middle list for each entry in the top tier containing a middle tier reference, each middle list having a plurality of entries, each of at least some of the middle list entries containing a bottom tier reference; and
- a bottom tier having a bottom list for each entry in the middle tier containing a bottom tier reference, each bottom list having a plurality of entries, each of at least some of the entries in the bottom list having a method descriptor corresponding to a method in the global table which is implemented by the schema class.

10. The computer system of claim 9 wherein the top list has up to 256 entries, each middle list has up to 16 entries; and each bottom list has up to 16 entries, whereby the dispatch table has references to up to 65,536 methods.

11. The computer system of claim 9 wherein a derived schema class is derived from a base schema class and automatically inherits all of the methods declared by the base schema class, the base schema class and the derived schema class each having a dispatch table, wherein the top tier of the derived schema class dispatch table is distinct from the top tier of the base schema class dispatch table, and wherein an entry in the top list of the derived schema class dispatch table refers to a middle list of the base schema class dispatch table if the corresponding middle list of the derived schema class would be identical.

12. The computer system of claim 9 wherein each of at least some of the schema classes implements a schema interface, the schema interface declaring additional methods, and wherein the dispatch table of the schema class includes the methods of the schema interface implemented by the schema class.

* * * * *